(12) United States Patent
Clemmons et al.

(10) Patent No.: US 9,969,031 B2
(45) Date of Patent: May 15, 2018

(54) NEAR-WELD PURGE GAS DELIVERY SYSTEM

(71) Applicant: CRC-Evans Pipeline International, Inc., Houston, TX (US)

(72) Inventors: Mark Clemmons, Houston, TX (US); Shankar Rajagopalan, Cypress, TX (US); Jason W. Curbo, League City, TX (US); Jose C. Bouche, Houston, TX (US); Siddharth Mallick, Spring, TX (US); Brian L. Kirk, Kingwood, TX (US)

(73) Assignee: CRC—Evans Pipeline International, Inc., Houston, TX (US)

( * ) Notice: Subject to any disclaimer, the term of this patent is extended or adjusted under 35 U.S.C. 154(b) by 0 days. days.

(21) Appl. No.: 15/056,293

(22) Filed: Feb. 29, 2016

(65) Prior Publication Data

US 2016/0256961 A1    Sep. 8, 2016
US 2018/0021891 A9    Jan. 25, 2018

Related U.S. Application Data

(63) Continuation-in-part of application No. PCT/US2015/062558, filed on Nov. 24, 2015, and a
(Continued)

(51) Int. Cl.
*B23K 37/00*    (2006.01)
*B23K 31/02*    (2006.01)
(Continued)

(52) U.S. Cl.
CPC .............. *B23K 31/027* (2013.01); *B23K 9/16* (2013.01); *B23K 9/291* (2013.01); *B23K 9/326* (2013.01)

(58) Field of Classification Search
CPC ....... B23K 31/027; B23K 9/16–9/1735; B23K 9/29–9/291; B23K 9/325–9/326; B23K 2201/04–2201/10
(Continued)

(56) References Cited

U.S. PATENT DOCUMENTS 3,095,844 A * 7/1963 Thielsch ................ B23K 9/325
 137/561 R
3,194,466 A * 7/1965 Davis ..................... B23K 9/325
 138/90
(Continued)

FOREIGN PATENT DOCUMENTS

EP    0116687    8/1984
GB    2201623 A * 9/1988 ............. B23K 9/326
(Continued)

*Primary Examiner* — Kiley Stoner
(74) *Attorney, Agent, or Firm* — Kofi A. Schulterbrandt; Michael P. Leary

(57) ABSTRACT

Apparatus, systems, processes, control systems, means and methods for near-weld gas purging and welding. A focused circumferential near-weld purge gas delivery system for pipeline welding. A near-weld purge rig which has a near-weld purge gas channel and which achieves a low oxygen concentration proximate to a pipe gap for welding. The gas used for purging is also directed against an interior surface of the pipe to be welded. The directed gas cools the pipe to a desired temperature.

17 Claims, 34 Drawing Sheets

Related U.S. Application Data continuation-in-part of application No. PCT/US2015/022665, filed on Mar. 26, 2015.

(60) Provisional application No. 62/127,267, filed on Mar. 2, 2015.

(51) Int. Cl.
*B23K 9/29* (2006.01)
*B23K 9/32* (2006.01)
*B23K 9/16* (2006.01)

(58) Field of Classification Search
USPC .......................................... 228/218–220, 42
See application file for complete search history.

(56) References Cited

U.S. PATENT DOCUMENTS

| | | | |
|---|---|---|---|
| 3,338,499 A | 8/1967 | Gilbert | |
| 3,684,856 A * | 8/1972 | Lifshits | B23K 11/0935 219/100 |
| 4,101,067 A * | 7/1978 | Sloan | B23K 37/003 219/136 |
| 4,522,716 A * | 6/1985 | LaValley | B01D 33/60 138/174 |
| 4,828,160 A * | 5/1989 | Sundholm | B23K 9/326 219/137.63 |
| 5,100,043 A * | 3/1992 | Hallenbeck | B23K 9/326 228/219 |
| 5,187,343 A * | 2/1993 | Edwards | B23K 9/326 138/90 |
| 5,304,776 A * | 4/1994 | Buerkel | B23K 9/0286 219/125.11 |
| 5,390,846 A * | 2/1995 | Thode | B23K 9/164 219/74 |
| 5,398,862 A * | 3/1995 | Aleman | B23K 37/0531 219/74 |
| 5,425,492 A | 6/1995 | Thode | |
| 5,435,478 A * | 7/1995 | Wood | B23K 9/0286 219/130.01 |
| 5,484,973 A * | 1/1996 | Gittens | B23K 9/326 219/61 |
| 5,669,547 A * | 9/1997 | Spring | B23K 9/164 228/219 |
| 5,864,111 A * | 1/1999 | Barefoot | B23K 9/0286 219/61 |
| 6,739,204 B1 * | 5/2004 | Barefoot | B23K 37/0533 219/136 |
| 6,779,944 B2 | 8/2004 | Schnorrer | |
| 7,112,358 B1 | 9/2006 | Hacikyan | |
| 7,632,556 B1 | 12/2009 | Hacikyan | |
| 8,530,777 B2 * | 9/2013 | Silk | B23K 9/164 219/121.51 |
| 8,540,137 B1 | 9/2013 | Hacikyan | |
| 8,616,432 B1 | 12/2013 | Hacikyan | |
| 9,296,060 B2 * | 3/2016 | Hacikyan | B23K 9/326 |
| 9,341,300 B2 * | 5/2016 | Hacikyan | F16L 55/134 |
| 9,586,284 B2 * | 3/2017 | Evans | B23K 9/326 |
| 2005/0224466 A1 * | 10/2005 | Halvorsen | B23K 9/0953 219/74 |
| 2006/0068142 A1 | 3/2006 | Hacikyan | |
| 2009/0230104 A1 * | 9/2009 | Domec | B23K 9/0282 219/121.78 |
| 2010/0012625 A1 * | 1/2010 | Silk | B23K 9/164 219/59.1 |
| 2010/0051672 A1 * | 3/2010 | Nunnery | B23K 37/0531 228/212 |
| 2011/0127238 A1 * | 6/2011 | Johnson | B23K 9/326 219/61.5 |
| 2012/0125600 A1 * | 5/2012 | Smith | F16L 13/02 166/127 |
| 2012/0152398 A1 * | 6/2012 | Laymon | F16L 13/02 138/155 |
| 2012/0152905 A1 * | 6/2012 | Laymon | B23K 9/0282 219/61.5 |
| 2013/0284297 A1 * | 10/2013 | Hacikyan | F16L 55/134 138/93 |
| 2014/0117068 A1 * | 5/2014 | Hacikyan | B23K 9/325 228/57 |
| 2014/0326779 A1 * | 11/2014 | Hacikyan | B23K 9/326 228/42 |
| 2015/0083785 A1 * | 3/2015 | Park | B23K 9/326 228/33 |
| 2016/0074955 A1 * | 3/2016 | Evans | B23K 9/326 228/219 |
| 2017/0182605 A1 * | 6/2017 | Rajagopalan | B23K 37/053 |

FOREIGN PATENT DOCUMENTS

| | | | | |
|---|---|---|---|---|
| GB | 2288562 A | * | 10/1995 | ............ B23K 9/325 |
| GB | 2327480 A | * | 1/1999 | ......... B23K 37/0531 |
| KR | 20100009350 A | * | 1/2010 | ............ B23K 9/326 |
| KR | 20100009351 A | * | 1/2010 | ............ B23K 9/326 |
| WO | WO 9601720 A1 | * | 1/1996 | ......... B23K 37/0531 |

\* cited by examiner

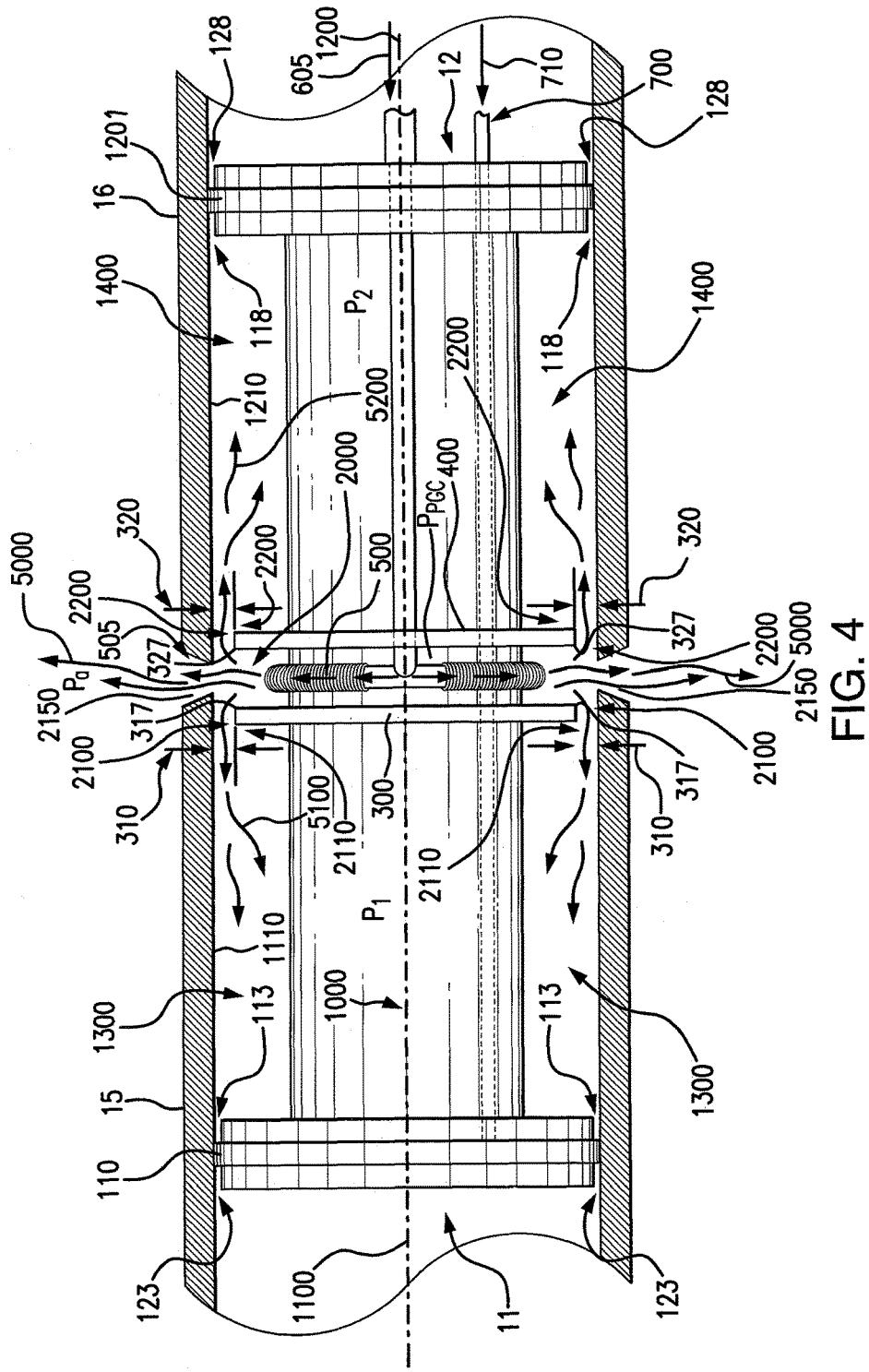

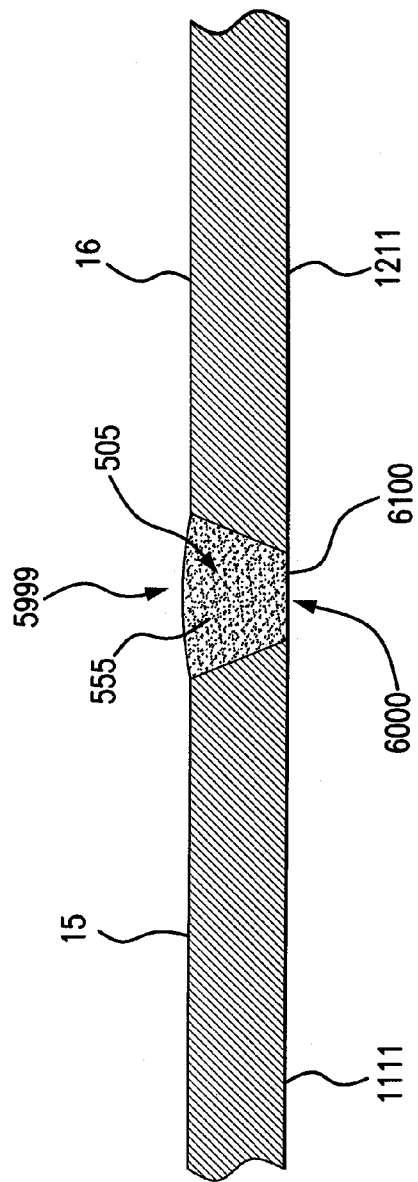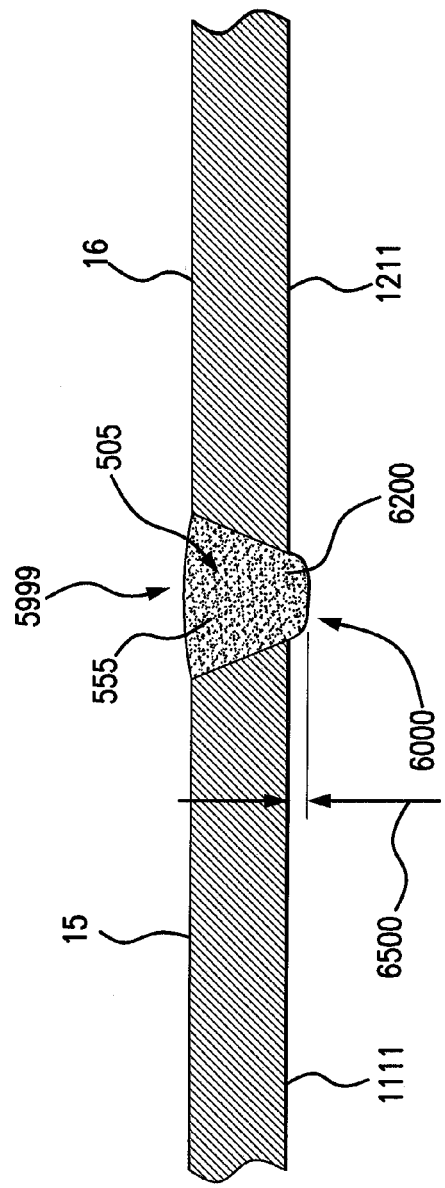

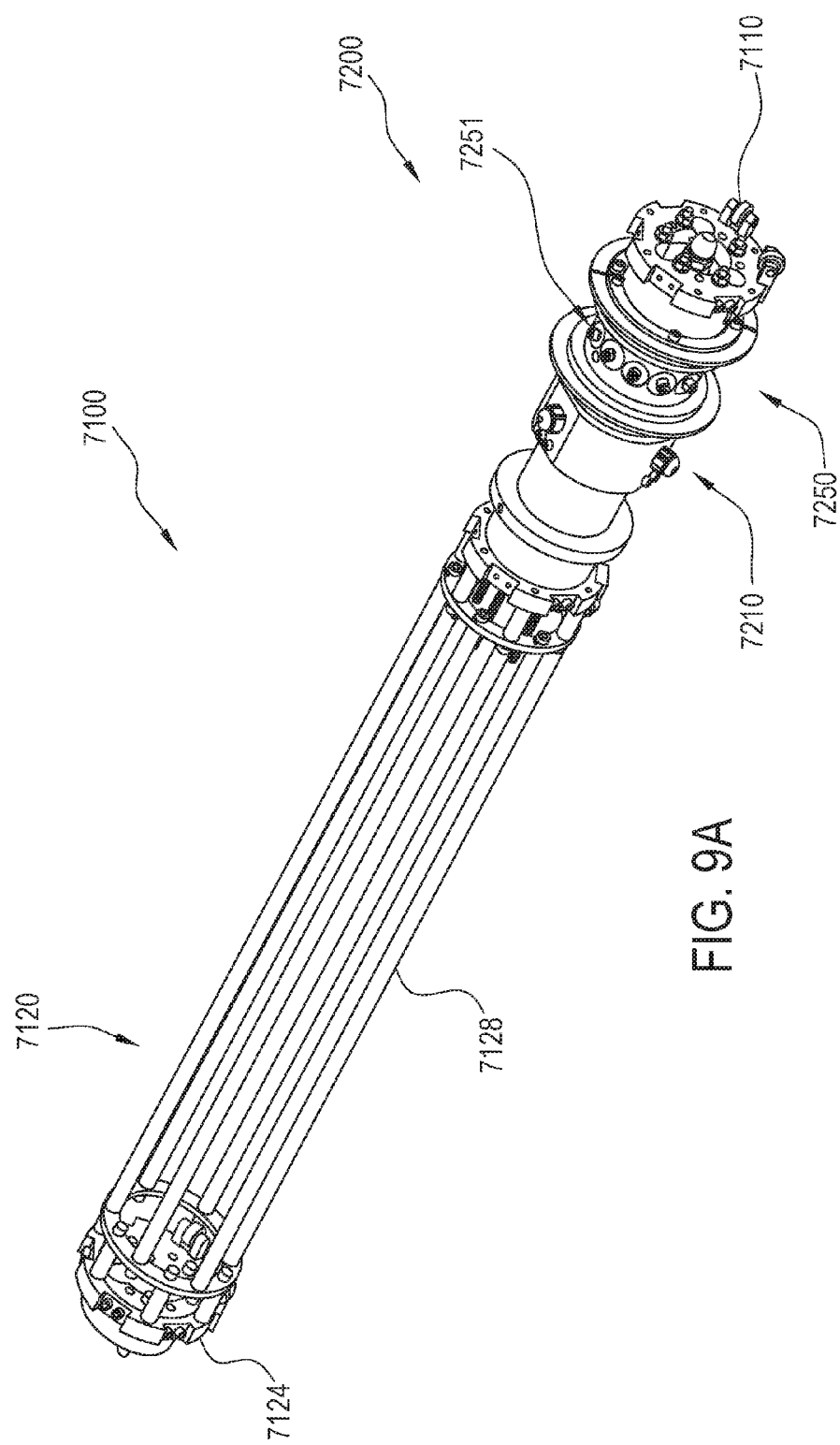

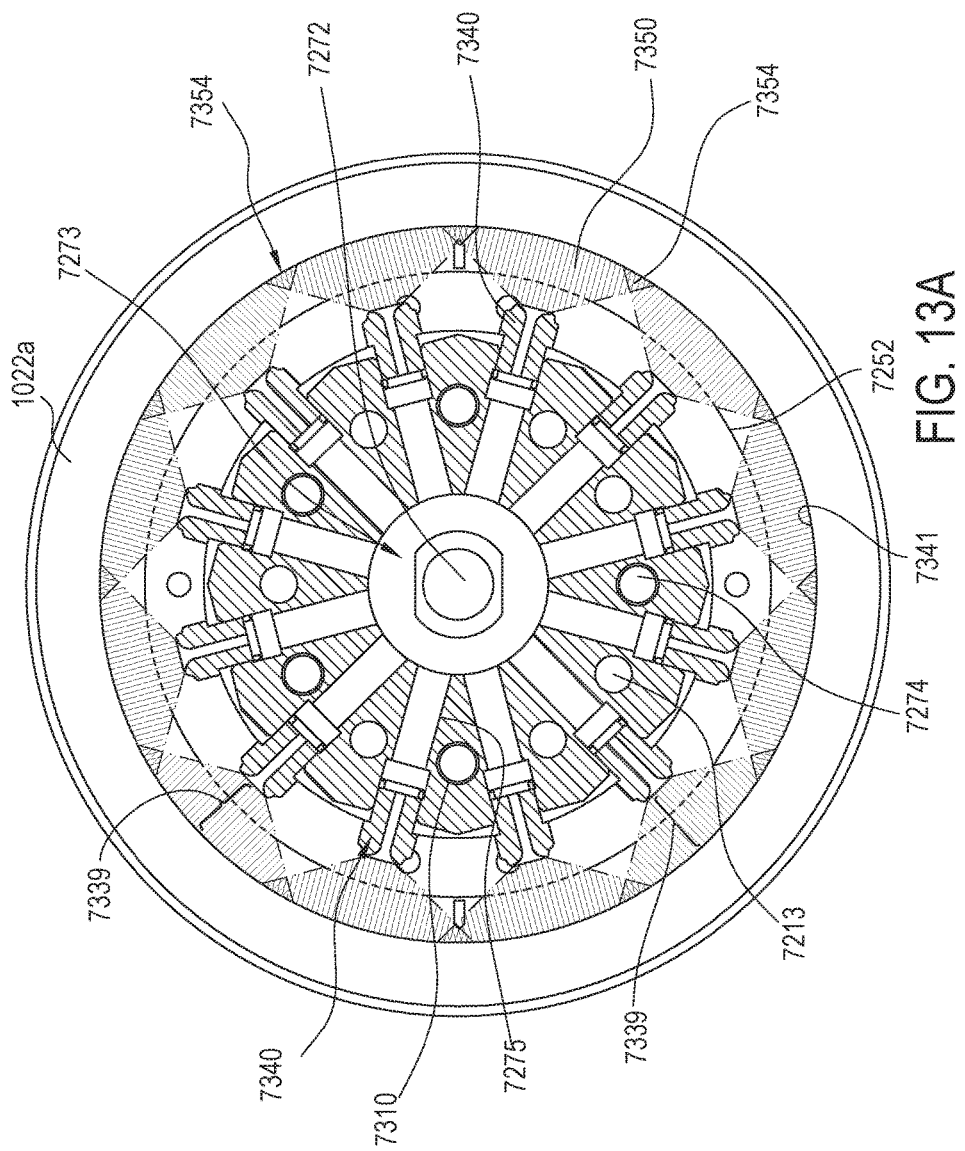

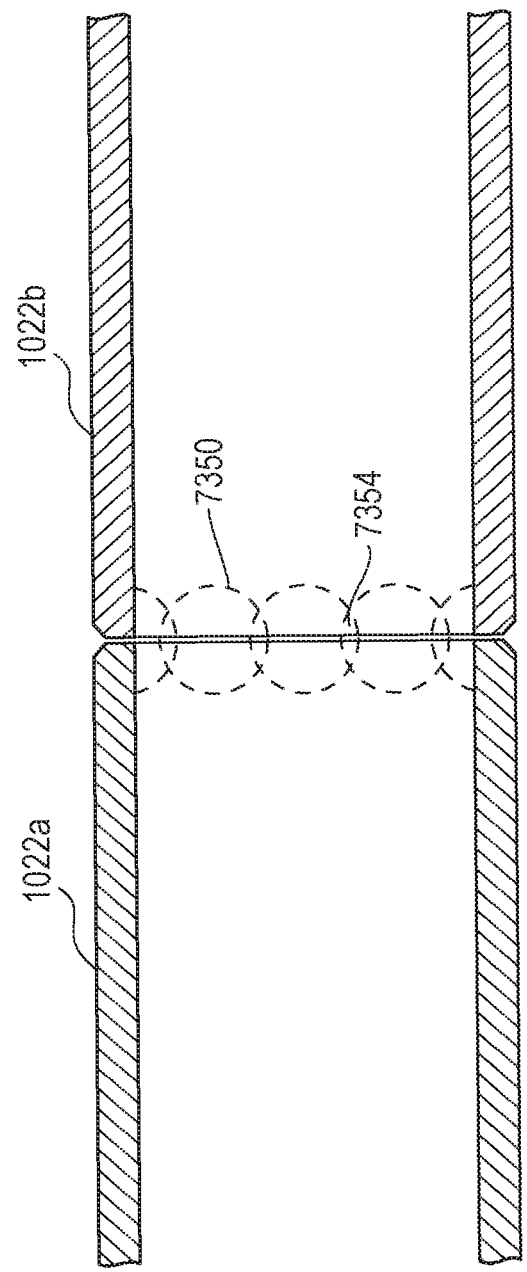

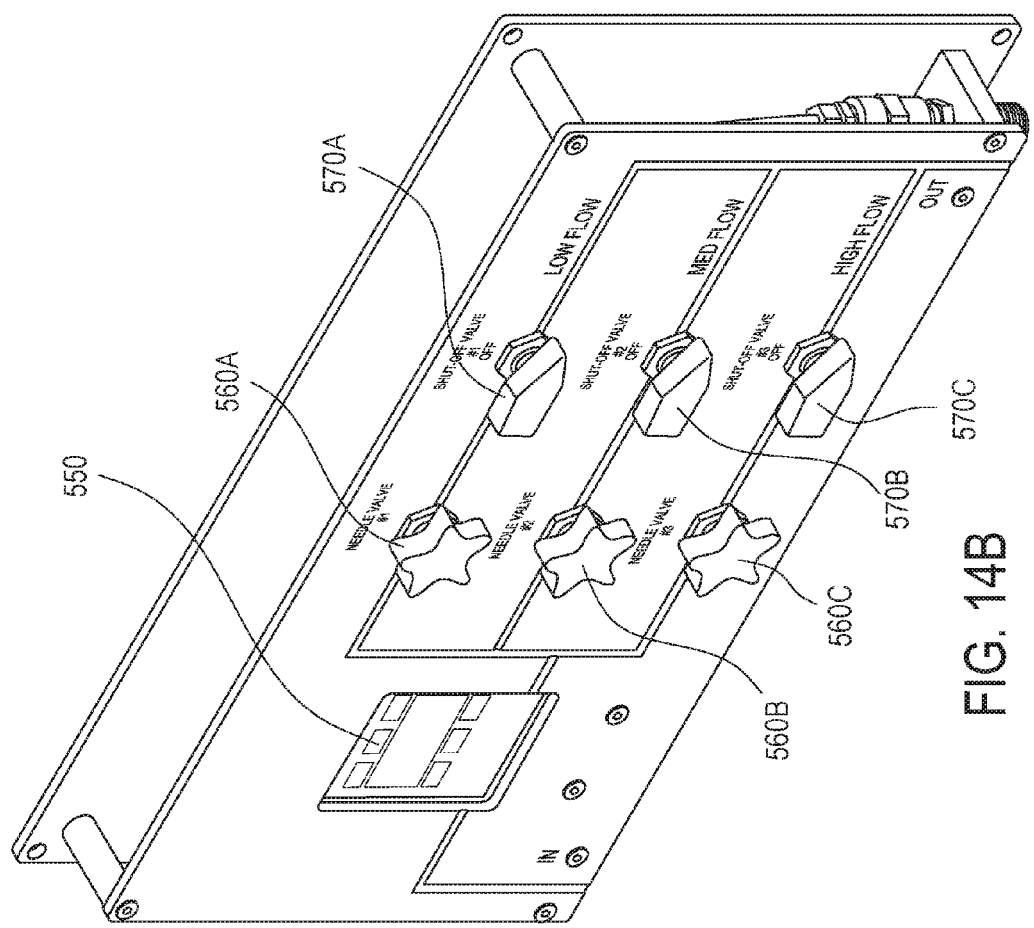

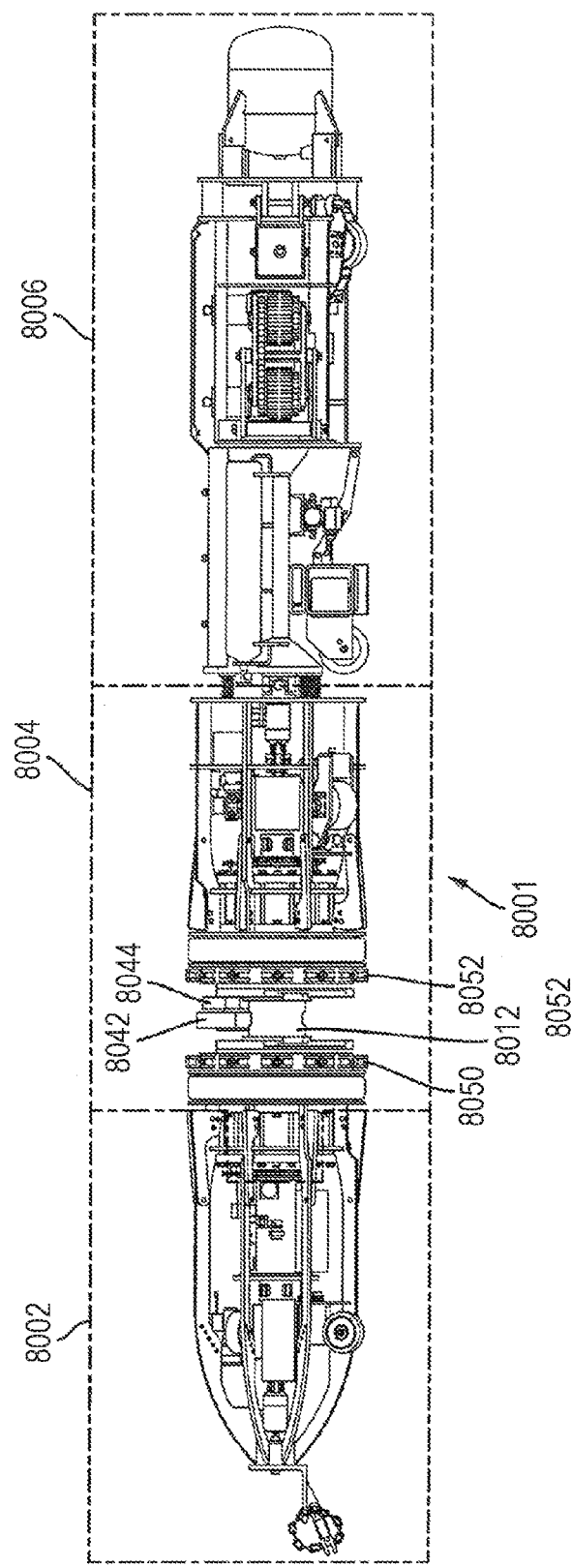

NEAR-WELD PURGE GAS DELIVERY SYSTEM

RELATED APPLICATIONS

The present application is a continuation in part of and claims priority under 37 CFR § 1.53(b) from non-provisional Patent Application No. PCT/US2015/22665, filed on Nov. 24, 2015 which is incorporated herein by reference in its entirety. The present application also claims priority under 35 U.S.C. § 119 from U.S. provisional Patent Application No. 62/127,267, filed on Mar. 2, 2015 and which is also incorporated herein by reference in its entirety.

FIELD OF THE INVENTION

The present invention relates to pipeline welding technology.

BACKGROUND OF THE INVENTION

When welding two pipe segments together in pipeline construction, it is desirable to minimize or eliminate if possible the amount of oxygen the weld is exposed to. One method of minimizing oxygen in the weld area (i.e., the area proximate the heated welding operation) is to displace the surrounding air (which contains oxygen) in the weld area with a pure or inert gas such as argon. To achieve this displacement, the present invention provides a near-weld purge rig having physical barriers that (together with a portion of the inner surface of the pipe) define a volume or near weld purge channel or purge space into which the inert gas is directed. The rig is then inserted into the pipe segments to be welded such that the purge channel overlaps, coincides with, or is superimposed in the weld area. When the pipe ends are positioned for welding, a gap may exist between them or the ends may be butted so that there is virtually no gap. Now, when the purge channel is filled with inert gas, the weld area is de facto filled with inert gas. Filling the weld area with inert gas means that oxygen is simultaneously being displaced from the weld area. An inert gas supply system is provided which provides a sufficient volume flow rate of inert gas to the purge channel to insure that the purge gas channel pressure is equal to or greater than atmospheric or ambient pressure. Passages between the rig and the pipe or through the gap allow inert gas to exit to the atmosphere so that there is a continuous flow of inert gas from the gas supply system into the channel and then back out either longitudinally down the pipe or out through the pipe gap (i.e., if a gap still exists before welding is complete). An oxygen sensor is positioned in the channel/weld area to track the oxygen concentration in the weld area. When the maximum acceptable oxygen content $O_{max}$ (e.g., in PPM) is reached, welding can begin.

The present invention also discloses an inert gas delivery system that continues to deliver inert gas at the weld site during welding and proximate the torch. Delivery of the inert gas at the weld site has been determined to have an advantageous cooling effect on pipe weld material when directed at a torch area of the internal surface of the pipe interface. The torch area is a portion of the internal surface of the pipe near the end abutment or gap proximate the portion of the gap or abutment where the torch is welding. Therefore, in addition to displacing oxygen from the weld area, it would be advantageous to provide a near-weld gas delivery rig that directed inert gas at the torch weld area to cool weld pipe material in order to control stability of weld pipe material.

SUMMARY OF THE INVENTION

The near-weld purge rig of the present invention can be configured for placement within a first pipe and within a second pipe which are configured to be welded together and which have a pipe interface between them which will be filled at least in part with a weld material. The pipe interface can be a gap or an abutment that is not air tight until welding is complete. A purge gas inlet can be configured to feed purge gas to a weld region from which certain gases (e.g., oxygen) is to be displaced. The purge gas inlet can also include at least one and preferably a plurality of radially extending nozzles for directing purge gas directly at the torch weld area. The weld area may be defined simply as the region inside the pipes to be welded proximate the abutted ends/edges of the pipes to be welded. The weld channel area may further be define by one or more baffles that limit the flow of or direct an inert gas supplied to the weld area. For example, one radially extending longitudinally positioned baffle may be used to form a barrier that prevents the inert gas from traveling longitudinally within the pipe on a first side of the baffle. In this case, the gas is introduced and congregates on a second side of the baffle and may be exhausted from the weld area on the second side of the baffle. Alternatively, two radially extending, longitudinally positioned baffles may be positioned so that the weld area is defined between the first baffle and the second baffle. The congregation of inert gas on the second side of the at least one baffle or between the first and second baffles defines a purge gas channel width. The purge gas channel width can be greater than the pipe gap width. The purge gas channel can be located along a near-weld purge rig centerline such that when the near-weld purge rig is placed within the first pipe and the second pipe, the pipe gap is located longitudinally at the purge gas channel.

The near-weld purge rig can have the first edge distance which can from 2-12 inches or less from the pipe gap. A second baffle, if necessary, can have at least a portion of a second baffle purge edge located a second edge distance which can be 2-12 inches or less from the pipe gap.

The near-weld purge rig can have a purge gas inlet which controls entry of an inert gas (e.g., argon) into the weld area. The inlet can be fitted with a gas distributor which distributes purge gas to an internal pipe gap circumference, when the near-weld purge rig is placed within the first pipe and the second pipe.

The near-weld purge rig can have a near-weld purge gas channel with a purge gas channel pressure that is greater than or equal to an ambient or atmospheric pressure, when the near-weld purge rig is placed within the first pipe and the second pipe. Furthermore, the near-weld purge rig can have a near-weld purge gas channel with an oxygen concentration of Omax ppm or less, where Omax is (e.g., 200, 100, or 75, etc.) and represents the magnitude of the maximum acceptable oxygen content/concentration in the channel.

BRIEF DESCRIPTION OF THE DRAWINGS

The present invention in its several aspects and embodiments solves the problems discussed above and significantly advances the technology of pipeline welding. The present invention can become more fully understood from the detailed description and the accompanying drawings, wherein:

FIG. 4 shows a side view of a near-weld purge rig which has been placed to have a first rig end in a first pipe and a second rig end in a second pipe and shows purge gas flows;

FIG. 7A shows a completed weld having a flat inner weld profile;

FIG. 7B shows a completed weld having a concave inner weld profile; and

FIG. 9A is another embodiment of a purge gas rig of the present invention.

FIG. 13A is a cross-sectional view through the nozzle assembly of the purge gas system of FIG. 9A.

FIG. 13B is a cross-sectional side view of the pipe showing a spray projection pattern of the system of FIG. 13A.

FIG. 14B is a front view of a manual control board of the purge gas rig of FIG. 9A.

FIG. 15 shows a purge and inspection system in accordance with an embodiment of the present patent application;

DETAILED DESCRIPTION OF THE INVENTION

This disclosure regards a focused circumferential near-weld purge gas delivery system for pipeline welding. It discloses a broad variety of apparatus, systems, processes, means; control systems and methods for near-weld gas purging and welding.

Figure 1:
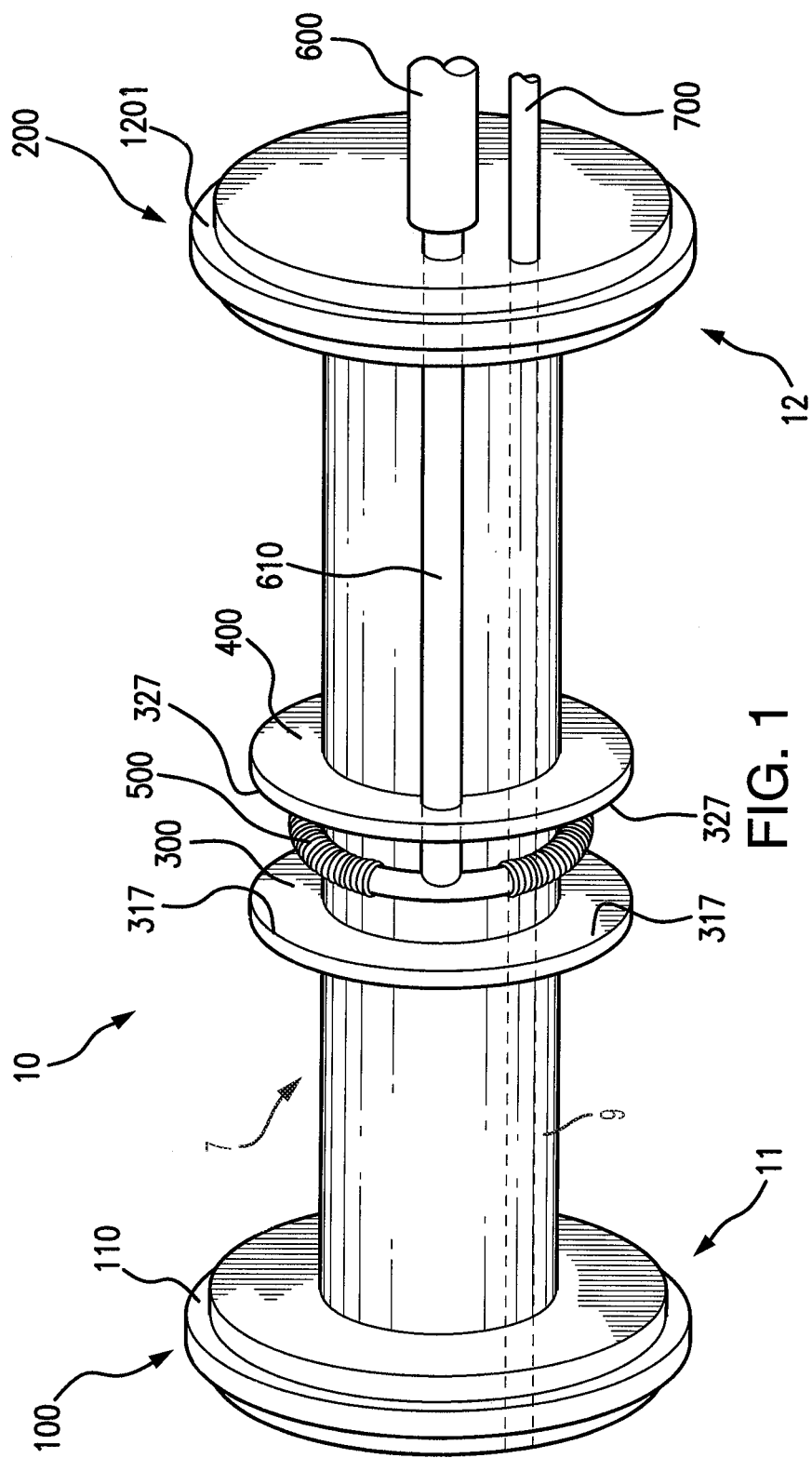
FIG. 1 shows a perspective view of a near-weld purge rig.

FIG. 1 shows a perspective view of a near-weld purge rig. In an embodiment, a near-weld purge rig 10 can have a core 7 having a core surface 9. Rig 10 can further include a first seal member 100 extending radially from core 7 at a first rig end 11, as well as a second seal member 200 extending radially from core 7 at a second rig end 12. The near-weld purge rig 10 can also have a gas distributor 500 which is configured between a first baffle 300 having first baffle purge edge 317 and a second baffle 400 having second baffle purge edge 327. The gas distributor 500 can have a purge gas feed with can flow through a purge gas feed line 610 from a purge gas supply line 600. The near-weld purge rig 10 can also have a seal member expansion gas feed line 700 which supplies a motive gas to inflate a first expandable seal 110 of the a first seal member 100 and a second expandable seal 1201 of the second seal member 200.

When the near-weld purge rig 10 is configured within portions of pipes to be welded, the first expandable seal 110 of the a first seal member 100 and the second expandable seal 1201 of the second seal member 200 can be expanded to create a first end seal 123 and a second end seal 128 (FIGS. 4, 5, 6 and 7).

Figure 2:
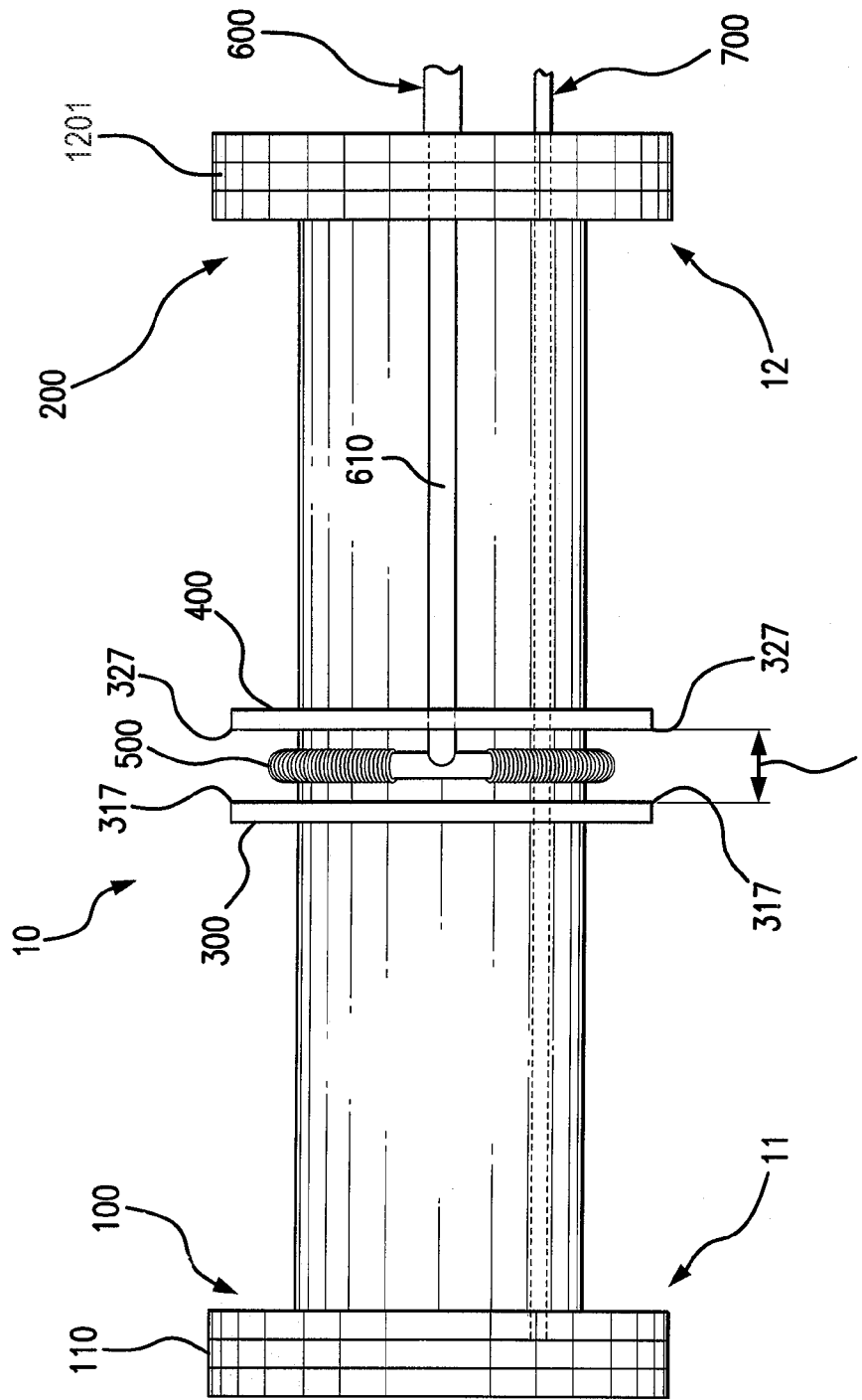
FIG. 2 shows a side view of a near-weld purge rig.

FIG. 2 shows a side view of a near-weld purge rig. The near-weld purge rig 10 of FIG. 2 is shown having the first expandable seal 110 of the a first seal member 100 and the second expandable seal 1201 of the second seal member 200 each in an unexpanded state. FIG. 2 also shows first baffle inner surface 315 and second baffle inner surface 322 are separated by a purge gas channel width 2010. It also shows the first baffle purge edge 317 and the second baffle purge edge also separated by the purge gas channel width 2010.

FIGS. 3 to 7 show the use and states of operation of the near-weld purge rig 10 at different stages of the near-weld purging and welding process.

Figure 3:
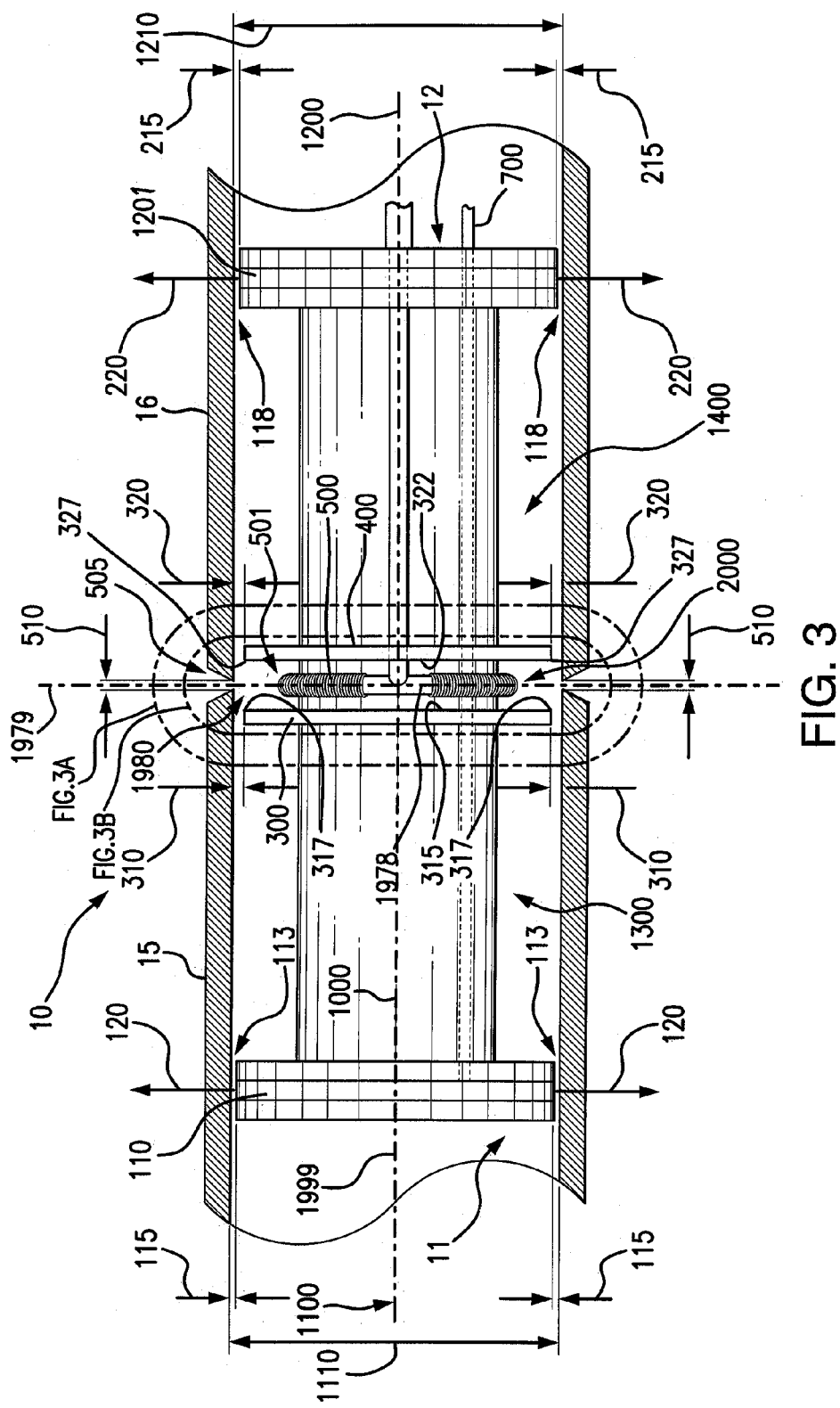
FIG. 3 shows a side view of a near-weld purge rig which has been placed to have a first rig end in a first pipe and a second rig end in a second pipe.

FIG. 3 shows a side view of a near-weld purge rig 10 which has been placed to have a first rig end 11 in a first pipe 15 and a second rig end in a second pipe 16. In an embodiment, the pipe gap 505 has a pipe gap width 510 and an internal pipe gap circumference 1980 oriented coplanar to pipe gap centerline plane 1979. In an embodiment, the gas distributor 500 can be configured within a near-weld purge gas channel 2000 and can have a coplanar distributor centerline plane 1978. A purge gas channel centerline plane 1977 can also be coplanar with the pipe gap centerline plane 1979 and the distributor centerline plane 1978.

The gas distributor 500 can be generally circular and have a gas distributor circumference 501. In an embodiment, the internal pipe gap circumference 1980 and the gas distributor circumference 501 can be coaxial and also coplanar, with the gas distributor circumference 501 being smaller in circumference than the internal pipe gap circumference 1980.

The non-limiting example of FIG. 3 shows the pipe gap 505 and the gas distributor 500 configured coplanar and also along a near-purge rig centerline 1000 having a position located between the first baffle 300 and the second baffle 400.

In an embodiment, flow paths for purge gas are provided to allow purge gas flow from the near-weld purge gas channel 2000 into one or more purge chambers, or otherwise as a purge gas effluent. A first baffle pipe clearance 310 is shown between the first pipe inner diameter 1110 and the first baffle purge edge 317. A second baffle pipe clearance 320 is shown between the second pipe inner diameter 1210 and the second baffle purge edge 327.

In the embodiment of FIG. 3, the near-weld purge gas channel 2000 is shown as the purge gas fillable volume extending between the first baffle inner surface 315 of first baffle 300 and the second baffle inner surface 322 of second baffle 400 and which is within the inner diameter surfaces of first pipe 15 and second pipe 16 and across the pipe gap width 510.

FIG. 3 shows a first pipe purge chamber 1300 formed within the first pipe inner diameter 1110 and between a first seal member 100 when the first expandable seal 110 is in an expanded state (FIG. 4) and first baffle 300.

FIG. 3 shows a second pipe purge chamber 1400 formed within the second pipe inner diameter 1210 and between a second seal member 200 when the second expandable seal 1201 is in an expanded state (FIG. 4) and second baffle 400.

In FIG. 3, the first expandable seal 110 is shown expanding to seal a first seal clearance 113 having a first seal pipe clearance distance 115 in a first seal radial expansion direction 120. In FIG. 3, the second expandable seal 1201 is shown expanding to seal a second seal clearance 118 having a second seal pipe clearance distance 215 in a second seal radial expansion direction 220.

Figure 3A:
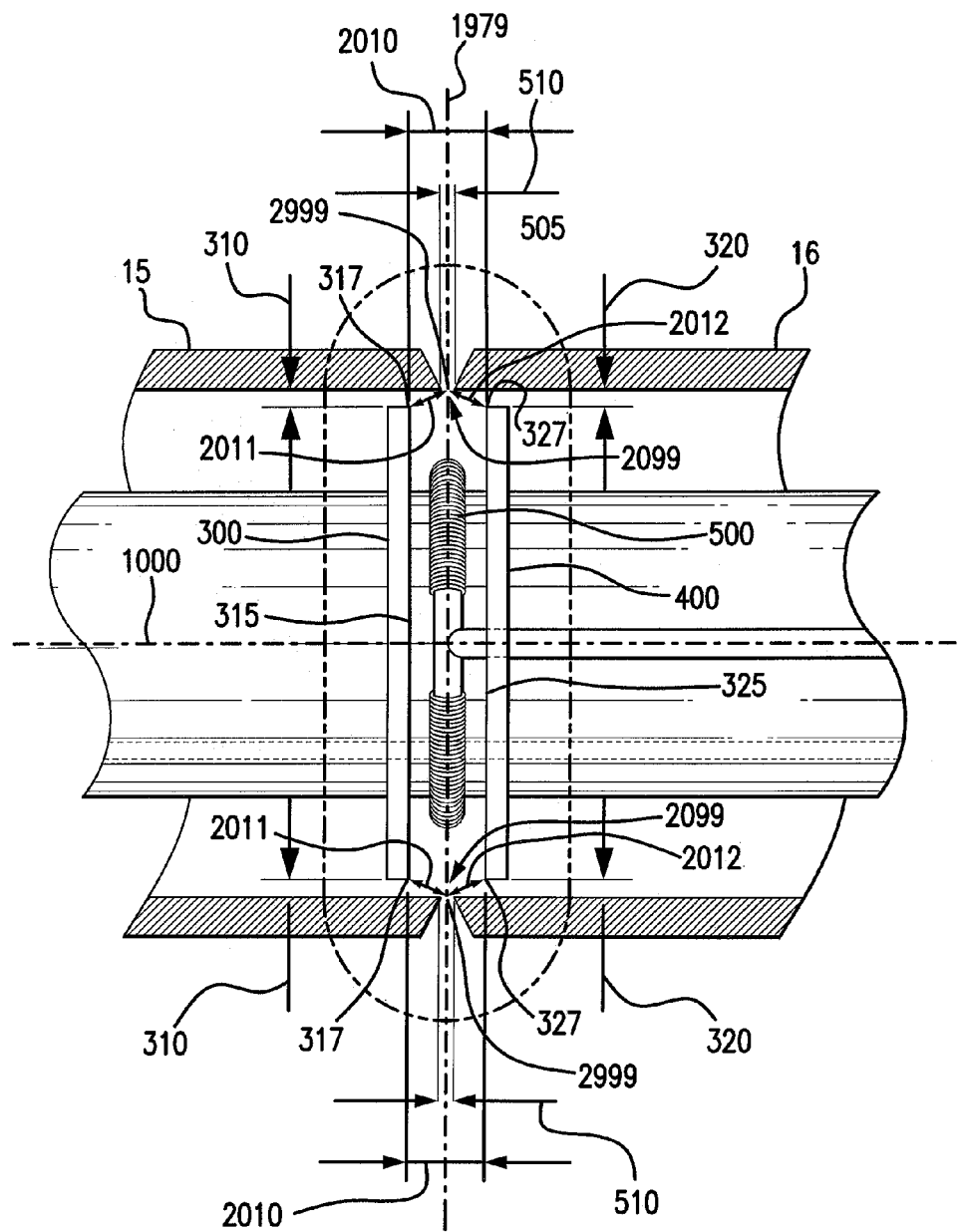
FIG. 3A shows a close up view of near-weld purge gas channel having a first baffle and a second baffle.

FIG. 3A shows a close up view of near-weld purge gas channel 2000 having a first baffle 300 and a second baffle 400. FIG. 3A shows the pipe gap width 510 and the pipe gap centerline plane 1979. FIG. 3A also shows a an instance of the internal pipe gap circumference 1980 referred to herein as the pipe gap centerpoint circumference 2099 formed at the intersection of the pipe gap centerline plane 1979 and the longitudinal columnar projection of the coplanar first pipe inner diameter 1110 and second pipe inner diameter 1210; and for which any point along the pipe gap centerpoint circumference 2099 is referred to herein as a pipe gap centerpoint 2999.

In an embodiment, a first baffle purge edge 317 is located at a first edge distance 2011 from the pipe gap centerpoint 2999; and the second baffle purge edge 327 is located at a second edge distance 2012 from the pipe gap centerpoint 2999.

The first edge distance 2011 and the second edge distance 2012 can be the same or different distances.

Numeric values and ranges herein, unless otherwise stated, also are intended to have associated with them a tolerance and to account for variances of design and manufacturing. Thus, a number can include values "about" that number. For example, a value X is also intended to be understood as "about X". Likewise, a range of Y-Z, is also intended to be understood as within a range of from "about Y-about Z". Unless otherwise stated, significant digits disclosed for a number are not intended to make the number an exact limiting value. Variance and tolerance is inherent in mechanical design and the numbers disclosed herein are intended to be construed to allow for such factors (in non-limiting e.g., ±10 percent of a given value). Likewise, the claims are to be broadly construed in their recitations of numbers and ranges.

For example, the first edge distance 2011 can have a length which is 30% or less of the inner diameter of a pipe to be welded, or it can be 30% or less of the diameter of the pipe gap centerpoint circumference 2099. In an embodiment, the first edge distance 2011 can have a value which is a percentage of the inner diameter of a pipe to be welded, such as 30%, or 25%, or 20%, or 15%, or 10%, or 7%, or 5%, or 4%, or 3%, or 2%, or 1%, or less. The first edge distance 2011 can be 12 in or less, such as 11 in, 10 in, 9 in, 8 in, 7 in, 6 in, 5 in, 4 in, 3 in, 2 in, 1 in, or less. The first edge distance 2011 can have a length which can be measured as a multiple of the pipe gap width 510, such as in a range of from 0.25 to 50 times the pipe gap width 510, 0.01 to 25 times pipe gap width, or 0.5 to 20 times pipe gap width 510, or 1 to 20 times pipe gap width 510, or 5 to 15 times pipe gap width 510, or 7 to 12 times pipe gap width 510.

For example, the second edge distance 2012 can have a length which can be 30% or less of the inner diameter of a pipe to be welded, or it can be 30% or less of the diameter of the pipe gap centerpoint circumference 2099. In an embodiment, the second edge distance 2012 can have length which is a percentage of the inner diameter of a pipe to be welded, such as 30%, or 25%, or 20%, or 15%, or 10%, or 7%, or 5%, or 4%, or 3%, or 2%, or 1%, or less. The second edge distance 2012 can be 12 in or less, such as 11 in, 10 in, 9 in, 8 in, 7 in, 6 in, 5 in, 4 in, 3 in, 2 in, 1 in, or less. The second edge distance 2012 can have a length which is measured as a multiple of the pipe gap width 510, such as in a range of from 0.25 to 50 times the pipe gap width 510, or 0.01 to 25 times pipe gap width 510, or 0.5 to 20 times pipe gap width 510, or 1 to 20 times pipe gap width 510, or 5 to 15 times pipe gap width 510, or 7 to 12 times pipe gap width 510.

Figure 3B:
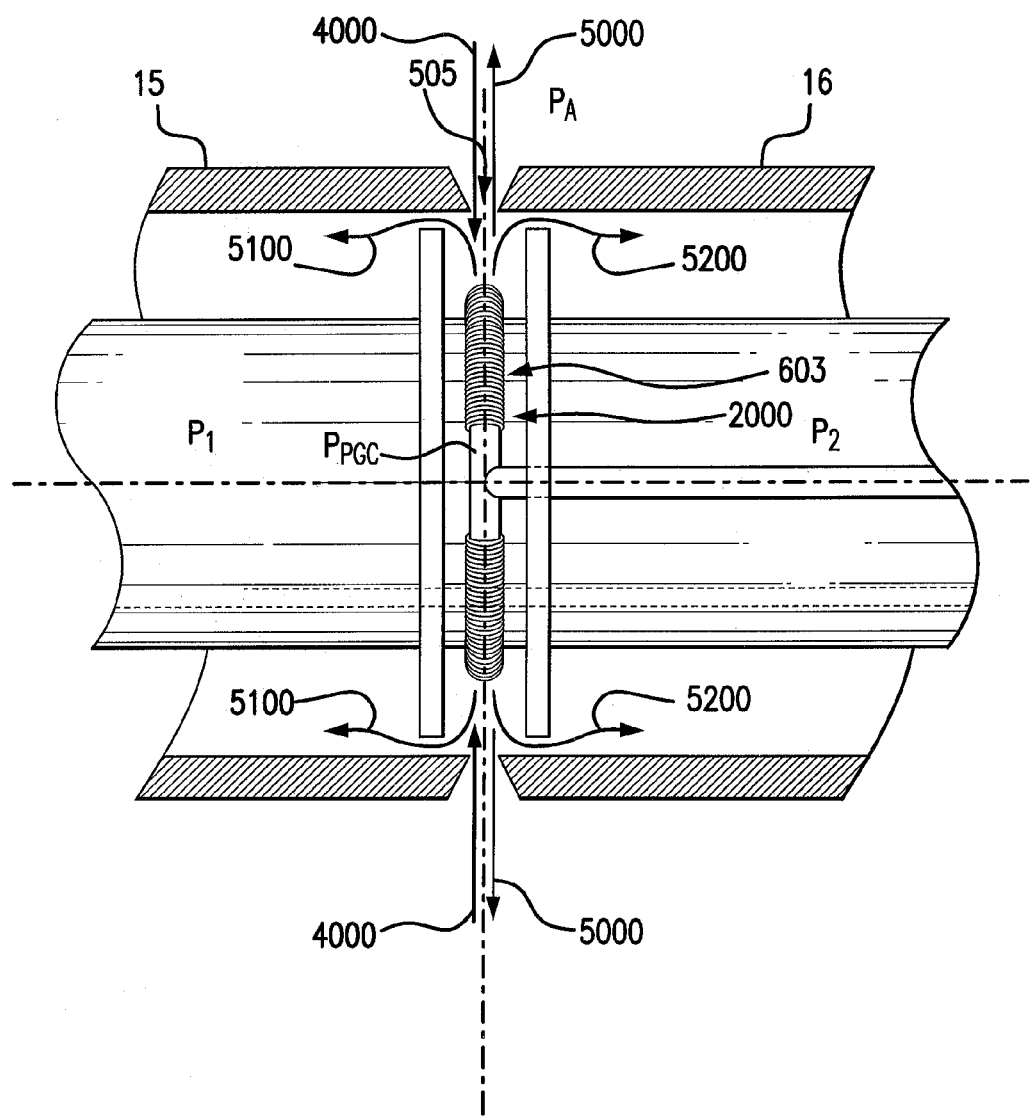
FIG. 3B shows a close up view of near-weld purge gas channel with purge gas flows.

FIG. 3B shows a close up view of near-weld purge gas channel with purge gas flows.

Air and/or oxygen can enter the near-weld purge gas channel 2000 as an ambient air flow 4000 when the pipe gap 505 is not welded closed and before the purge gas channel pressure Ppgc rises above ambient pressure. When the pipe gap 505 is not welded closed, a purge gas 603 can have: a purge gas flow to ambient environment 5000; a purge gas flow to first pipe purge chamber 5100; and a purge gas flow to second pipe purge chamber 5200.

As the purge gas channel pressure Ppgc rises above ambient pressure, then the near-weld purge gas channel

2000 will have a positive pressure as compared the ambient environment outside of the pipe and the purge gas 603 will block, dilute and drive out air and oxygen from the near-weld purge gas channel 2000. When the purge gas channel pressure Ppgc is above ambient the purge gas 603 flow will include one or more of a purge gas flow to ambient environment 5000, a purge gas flow to first pipe purge chamber 5100 and a purge gas flow to second pipe purge chamber 5200.

These purge gas flows will purge the pipe gap 505 of oxygen and pressurize the first pipe purge chamber 1300 to a first pipe purge chamber pressure $P_1$ and second pipe purge chamber 1400 with predominantly the purge gas 603 to a second pipe purge chamber pressure $P_2$. $P_1$ and $P_2$ can be maintained above ambient pressure by the purge gas 603 an pressurization by the purge gas 603.

FIG. 3B shows purge gas flow to first pipe purge chamber 5100 through a first near-weld gas purge gap 2100 formed by a first baffle pipe clearance 310, as well as purge gas flow to a second pipe purge chamber 5200 through a first near-weld gas purge flow 2110 formed by a second baffle pipe clearance 320.

The purging and pressurization of the near-weld purge gas channel 2000 creates a low oxygen environment for the welding a weld material 550 (FIG. 5) to close the pipe gap 505. In an embodiment, near-weld purge gas channel 2000 can be purged to create a low oxygen environment in which the near-weld purge gas channel 2000 has an oxygen concentration which is less than 500 ppm $O_2$ (also as "ppm oxygen"). The near-weld purge gas channel 2000 can have a channel gas composition 607 which has been purged with purge gas 603 to achieve oxygen concentrations in the channel gas composition 607 which are for example of less than 450 ppm $O_2$, or less than 400 ppm $O_2$, or less than 350 ppm $O_2$, or less than 300 ppm $O_2$, or less than 350 ppm $O_2$, or less than 300 ppm $O_2$, or less than 250 ppm $O_2$, or less than 200 ppm $O_2$, or less than 175 ppm $O_2$, or less than 150 ppm $O_2$, or less than 125 ppm $O_2$, or less than 100 ppm $O_2$, or less than 75 ppm $O_2$, or less than 50 ppm $O_2$, or less than 25 ppm $O_2$, or less than 10 ppm $O_2$, or less. In embodiments, the near-weld purge gas channel 2000 can have a channel gas composition 607 having an oxygen concentration in the range of 25 ppm $O_2$ to 300 ppm $O_2$, or 25 ppm $O_2$ to 200 ppm $O_2$, or 25 ppm $O_2$ to 150 ppm $O_2$, or 25 ppm $O_2$ to 100 ppm $O_2$, or 50 ppm $O_2$ to 150 ppm $O_2$, or 25 ppm $O_2$ to 125 ppm $O_2$, or 50 ppm $O_2$ to 125 ppm $O_2$, or 75 ppm $O_2$ to 125 ppm $O_2$, or 50 ppm $O_2$ to 100 ppm $O_2$, or 30 ppm $O_2$ to 90 ppm $O_2$, or 40 ppm $O_2$ to 80 ppm $O_2$, or less.

FIG. 4 shows a side view of a near-weld purge rig 10 which has been placed with a first rig end 11 in a first pipe 15 and a second rig end 12 in a second pipe 16 and also shows purge gas flows. In the example of FIG. 4, the near-weld purge gas channel 2000 is pressurized having the purge gas channel pressure Ppgc above the ambient pressure Pa. In this example, first pipe purge chamber pressure $P_1$ and second pipe purge chamber pressure $P_2$ are also above the ambient pressure Pa. In FIG. 4 a positive pressure as compared the ambient environment outside and a low oxygen concentration has been achieved.

In an embodiment, the purge gas channel pressure Ppgc is controlled to a pressure above the ambient pressure Pa and at a value which does not negatively affect the application of the welding material 555. The purge gas channel pressure Ppgc can have a value in a wide range from just above ambient temperature, such as 0.001 PSIG to 150 PSIG. In an embodiment, the purge gas channel pressure Ppgc can be controlled to have a pressure of 0.005 PSIG to 10 PSIG. In another embodiment, the purge gas channel pressure Ppgc can be controlled to have a pressure of 0.01 PSIG to 5 PSIG, or 0.05 PSIG to 4 PSIG, or 0.05 PSIG to 3 PSIG, or 0.05 PSIG to 2 PSIG, or 0.05 PSIG to 1 PSIG, or 0.01 PSIG to 5 PSIG, or 0.01 PSIG to 4 PSIG, or 0.01 PSIG to 3 PSIG, or 0.01 PSIG to 2 PSIG, or 0.01 PSIG to 1 PSIG.

The amount of purge gas flow can also vary widely depending upon the welding conditions, such as the size of the pipe, the pipe gap width 550 and the environmental conditions. In an embodiment, the purge gas 603 flow rate can be in a range of from 10 CFH (ft^3/hr) to 500 CFH. In non-limiting example, the purge gas 603 flow rate can be in a range of from 10 CFH to 400 CFH, or 50 CFH to 300 CFH, or 50 CFH to 200 CFH, or 50 CFH to 1500 CFH, or 50 CFH to 100 CFH, or 75 CFH to 250 CFH, or 90 CFH to 130 CFH, or 100 CFH to 200 CFH, or 100 CFH to 150 CFH, or 80 CFH to 125 CFH, or 90 CFH to 125 CFH.

The current near-weld purge technology provides a number of advantages, including but not limited to: focused near-weld purging, focused circumferential near-weld purging, increased cooling of a pipe-gap, a weld area, or a weld-in-progress with the purge gas flow; controlled positive pressure before, during and after welding; purge gas temperature control; real-time purge gas flow control in response to welding activities and welding demands; and synchronized purge and welding actions.

In an embodiment, a plurality of baffles, such as the first baffle 300 and the second baffle 400, can be configured to focus purge gas 603 upon the pipe gap 505 and/or weld area. This focused purging both purges and temperature controls and/or cools the weld-in-progress and/or weld area. The plurality of baffles, such as the first baffle 300 and the second baffle 400, can be formed and shaped in a variety of manners to direct and/or focus and/or concentrate the purge gas 603 upon the pipe gap 505 and/or weld area.

In an embodiment, the near-weld purge rig 10 is configure to have baffles formed to deliver purge gas flow in a focused and concentrated stream directly upon the point of welding and/or pipe gap 505.

Increasing the flow of purge gas 603 to a weld-in-progress will provide cooling to the weld material 550 as it is applied during welding.

In another embodiment, focusing and/or increasing the flow of purge gas 603 to a weld-in-progress will provide a gas flow cushion which will buoy and/or provide a radial force upon the weld material as it is deposited which is away from the near purge rig centerline 1999 upon the weld material 550 as it is applied during welding which will increase the quality of the final weld by inhibiting irregularities in the inner surface of the final weld 5999.

In an embodiment, the purge gas 603 temperature can be controlled to achieve desired cooling, warming, or tempering effects upon the weld material 550 as it is applied during welding. In an embodiment, the purge gas 603 temperature can be set at a desired temperature to cool the weld as it is being welded and thereafter. In some instances, the purge gas 603 temperature can be ambient temperature, or it can be cooled to a temperature below ambient. In another embodiment, a purge gas 603 can have a temperature above ambient can be used. For non-limiting example, the purge gas 603 can have a temperature in a range of −20° C. to 150° C., or from −10° C. to 60° C., or from −10° C. to 50° C., or from 0° C. to 45° C., or from 10° C. to 35° C.

Figure 5:
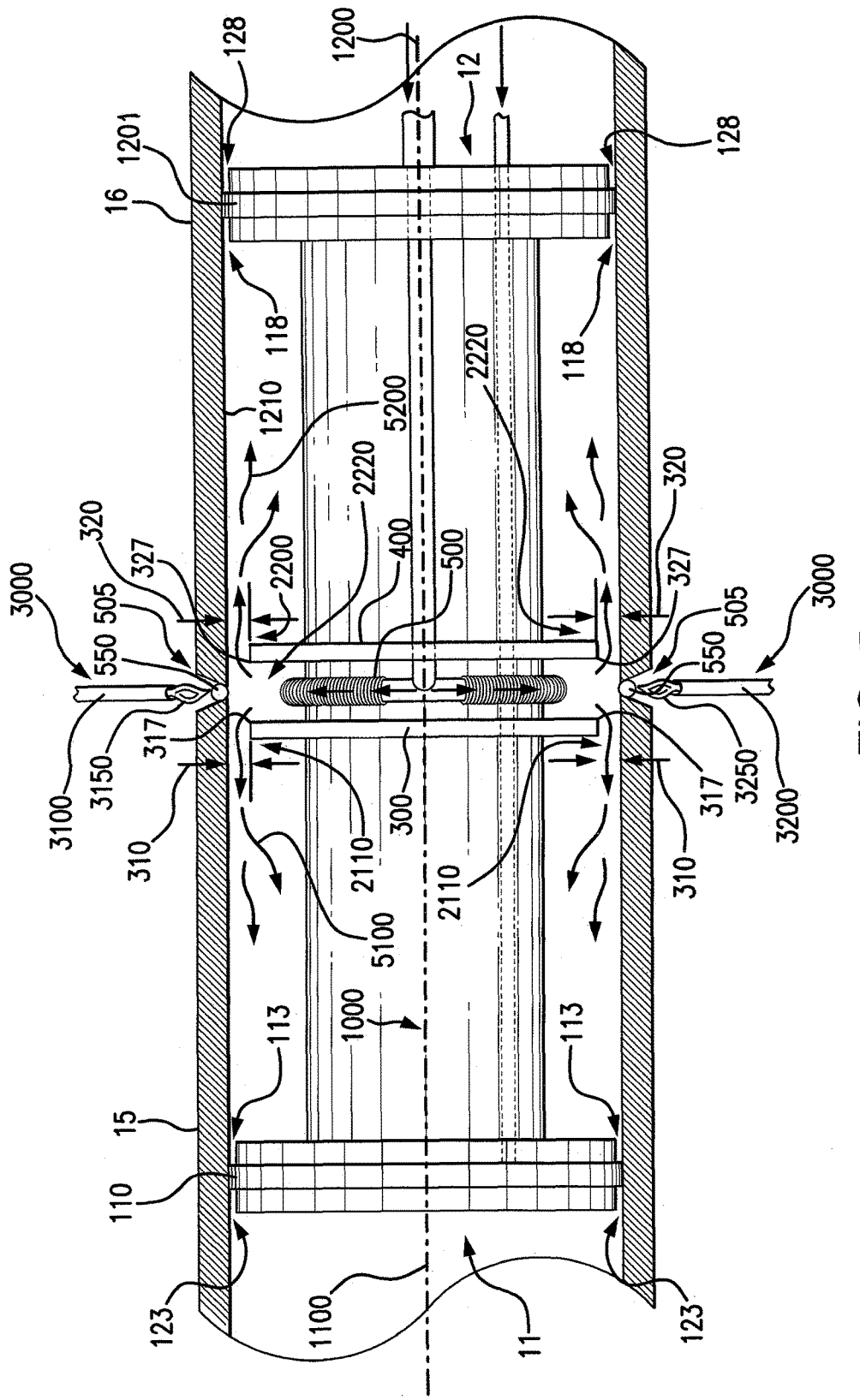
FIG. 5 shows an early stage of welding of a pipe gap in the purge gas channel.

FIG. 5 shows an early stage of welding of a pipe gap in the purge gas channel. FIG. 5 shows a weld material 550 being welded to close the pipe gap 505 by at least one welding torch 3000. A number of welding torches can be used at the same or different times to accomplish the weld depicted in FIG. 5. For example 1 . . . n welding torches can be used, where n is in the range of 1 to 20 welding torches, such as 1, 2, 3, 4, 5, 6, 7, 8, 9 or 10 welding torches. In an embodiment, 2 welding torches are used. In another embodiment, 3 welding torches are used. In an embodiment, 4 welding torches are used. In an embodiment, 5 welding torches are used. In an embodiment, 6 welding torches are used. Purging with purge gas 603 continues as shown by the plurality of arrows.

The non-limiting example embodiment of FIG. 5 shows a first welding torch 3100 having a first heat source 3150 and/or weld energy source and a second welding torch 3200 having second heat source 3250 and/or weld energy source which are used simultaneously to perform the welding of the pipe gap 505 with the a weld material 550.

Figure 6:
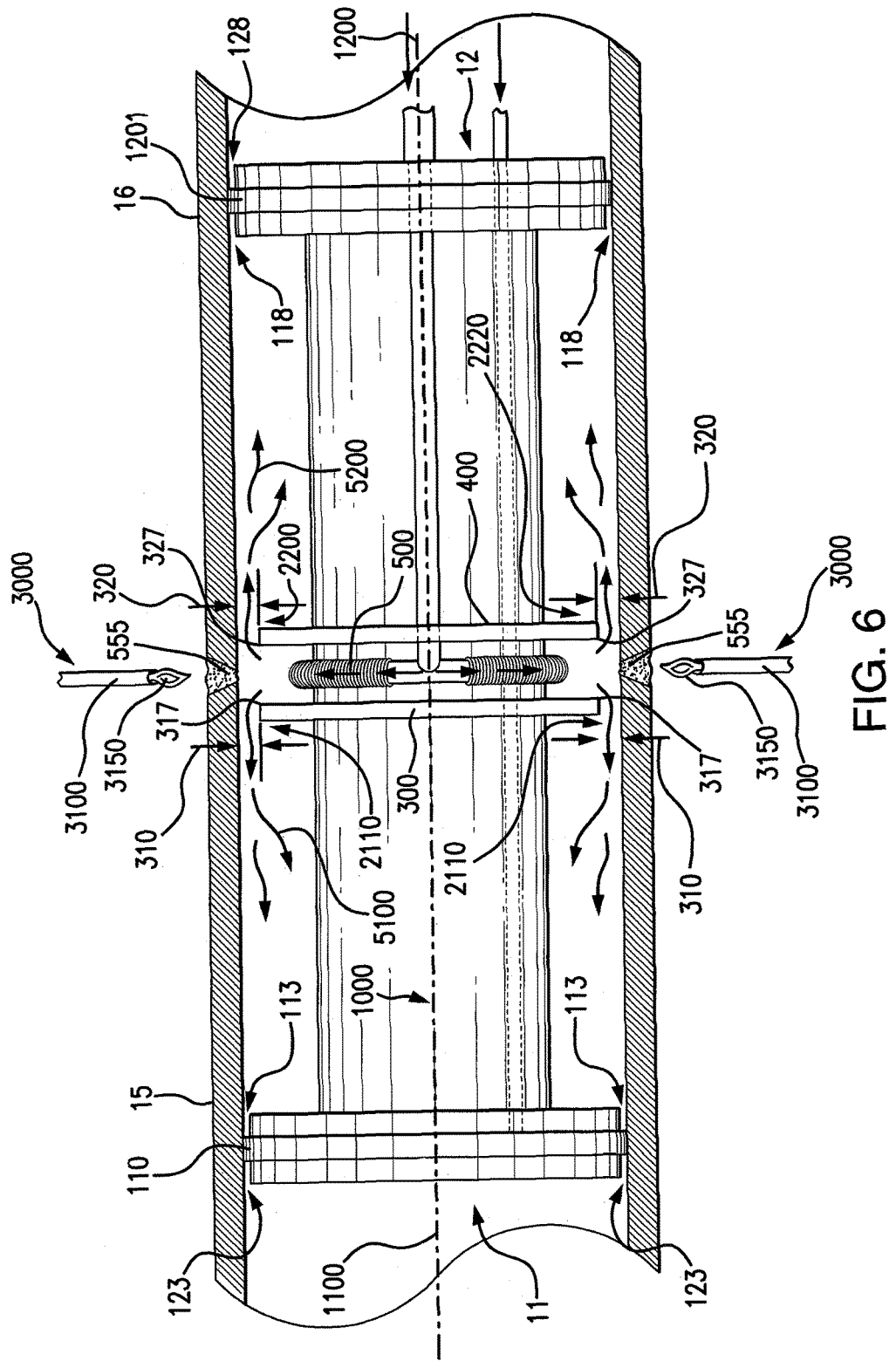
FIG. 6 shows a later stage during welding of a pipe gap.

FIG. 6 shows a later stage during welding of a pipe gap 505. FIG. 6 shows welding of the pipe gap 505 with the weld material 550 at a stage where the weld material 550 has been applied to almost complete the welding together of the first pipe 515 and the second pipe 16. At the stage of welding depicted in FIG. 6 first welding torch 3100 having the first heat source 3150 and/or weld energy source and a second welding torch 3200 having second heat source 3250 and/or weld energy source have almost completed applying new weld material 550. Purging with purge gas 603 continues as shown by the plurality of arrows.

Figure 7:
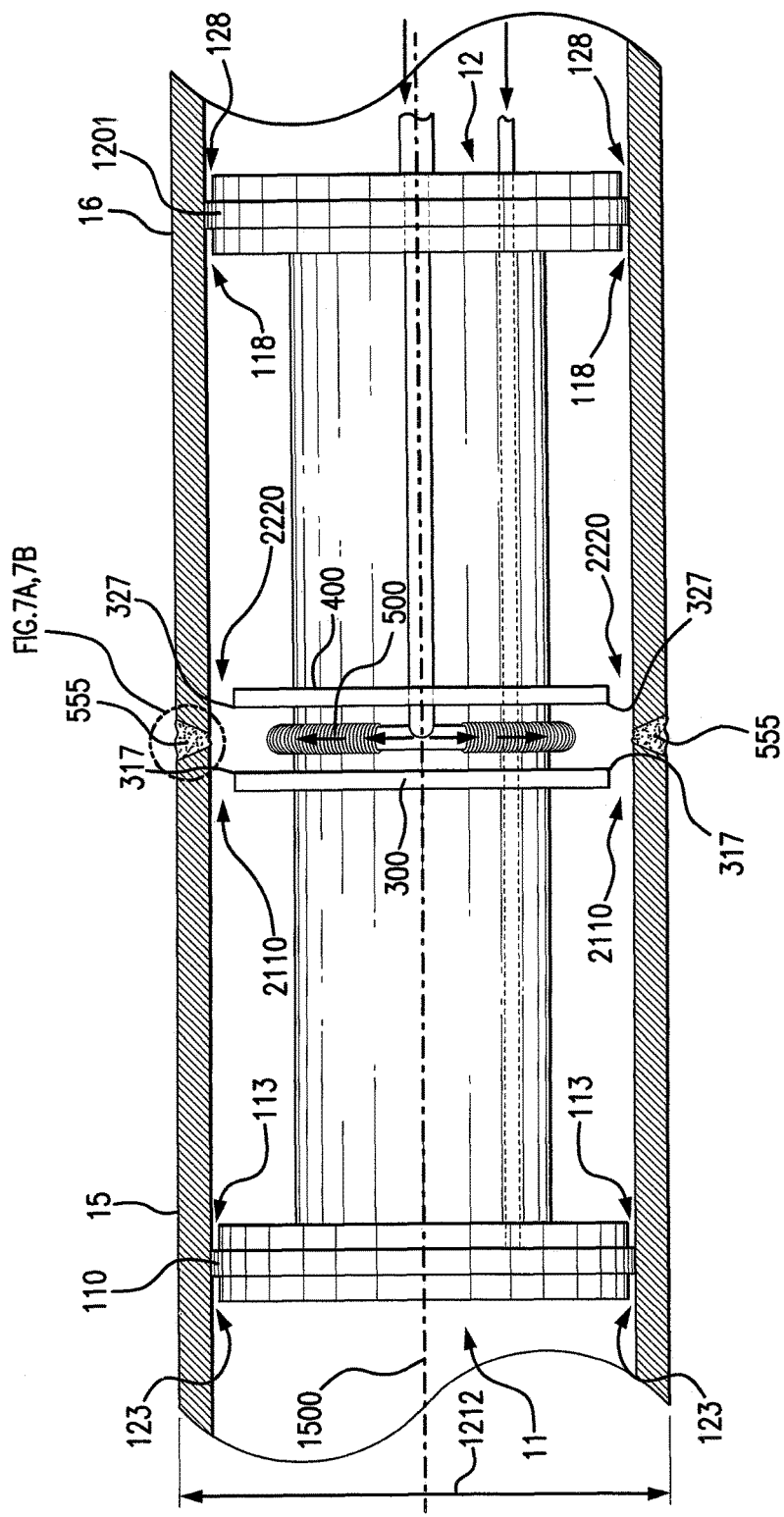
FIG. 7 shows a completed weld of a pipe gap.

FIG. 7 shows a completed weld 555 of the pipe gap 505. FIG. 7 shows the completed weld 555 fully joining the first pipe 15 and the second pipe 16. The welding torches are no longer acting on the weld and/or weld material and purging with the purge gas 603 has stopped.

The first expandable seal 110 and second expandable seal 120 can be retracted and/or deflated; and the near-weld purge rig 10 can be removed from within the welded pipe.

FIG. 7 shows a completed weld 5999 having a flat inner weld profile 6100. The near-weld purge gas technology disclosed herein produces a completed weld 5999 which has a weld inner surface profile 6000 of unexpectedly high quality. In an embodiment, using the near-weld purge rig 10 having near-weld purge gas channel 2000 to purge during a weld produces a weld inner surface profile 6000 which can range in shape from a flat inner weld profile 6100 to a concave inner weld profile 6200.

FIG. 7A shows an example of the flat inner weld profile 6100 formed joining first pipe 15 and second pipe 16. As shown in FIG. 7A, the flat inner weld profile 6100 can be coplanar with an inner diameter surface 1111 of first pipe 15 and coplanar with an inner diameter surface 1211 of second pipe 16. In this embodiment, the welded pipe inner diameter 1212 can be the same for the first pipe 15, the second pipe 16 and the flat inner weld profile 6100 of the completed weld 5999.

FIG. 7B shows a completed weld 5999 having a concave inner weld profile 6200. In an embodiment, the near-weld purge gas technology disclosed herein produces a completed weld 5999 which has a weld inner surface profile 6000 which is the concave inner weld profile 6200. The concave inner weld profile 6200 can have a concavity protrusion height 6500 which extends from the inner diameter surface 1111 of first pipe 15 and coplanar with an inner diameter surface 1211 of second pipe 16 inward toward the near purge rig centerline 1999. The concavity protrusion height 6500 can vary with the amount of concavity of the weld inner surface profile 6000, which can range from minor concavity to significant concavity. The weld inner surface profile 6000 can range from concave and almost coplanar with the inner diameter surface 1111 of first pipe 15 and coplanar with an inner diameter surface 1211 of second pipe 16, to highly concave and protruding into the pipe flow path radially toward the near purge rig centerline 1999.

In an embodiment, the concavity protrusion height 6500 can range from 0.001 mm to 6 cm, such as from 0.05 mm to 4 cm, or 1 mm to 2 cm, or 0.05 mm to 1 cm, or 0.5 mm to 1 cm, or 0.05 mm to 5 mm, or more. The concavity protrusion height 6500 can be 0.5 mm, 1 mm, 1.5 mm, 2.0 mm, 2.5 mm, 3.0 mm, 3.5 mm, 4.0 mm, 4.5 mm, 5 mm, or greater. The concavity protrusion height 6500 can be less than 4 cm, or less than 3 cm, or less than 2 cm, or less than 1 cm, or less than 0.5 cm. The concavity protrusion height 6500 can have a value less than the pipe gap width 510. The concavity protrusion height 6500 can have a value greater than the pipe gap width 510. The concavity protrusion height 6500 can have a value less than a wall thickness of a pipe being welded. The concavity protrusion height 6500 can have a value greater than a wall thickness of a pipe being welded.

Additionally, the near-weld purge gas technology disclosed herein produces a completed weld 5999 which has a weld inner surface profile 6000 and which has experienced no blow throughs during the first or subsequent passes of the welding material as applied to the pipe gap 505. The near-weld purge rig 10 can have the first baffle 300 and the second baffle 400 configured to direct the purge gas flow to the pipe gap 505 such that the purge gas does not result in a blow through of the welding material 550 as it is applied during first and subsequent weld passes.

Figure 8:
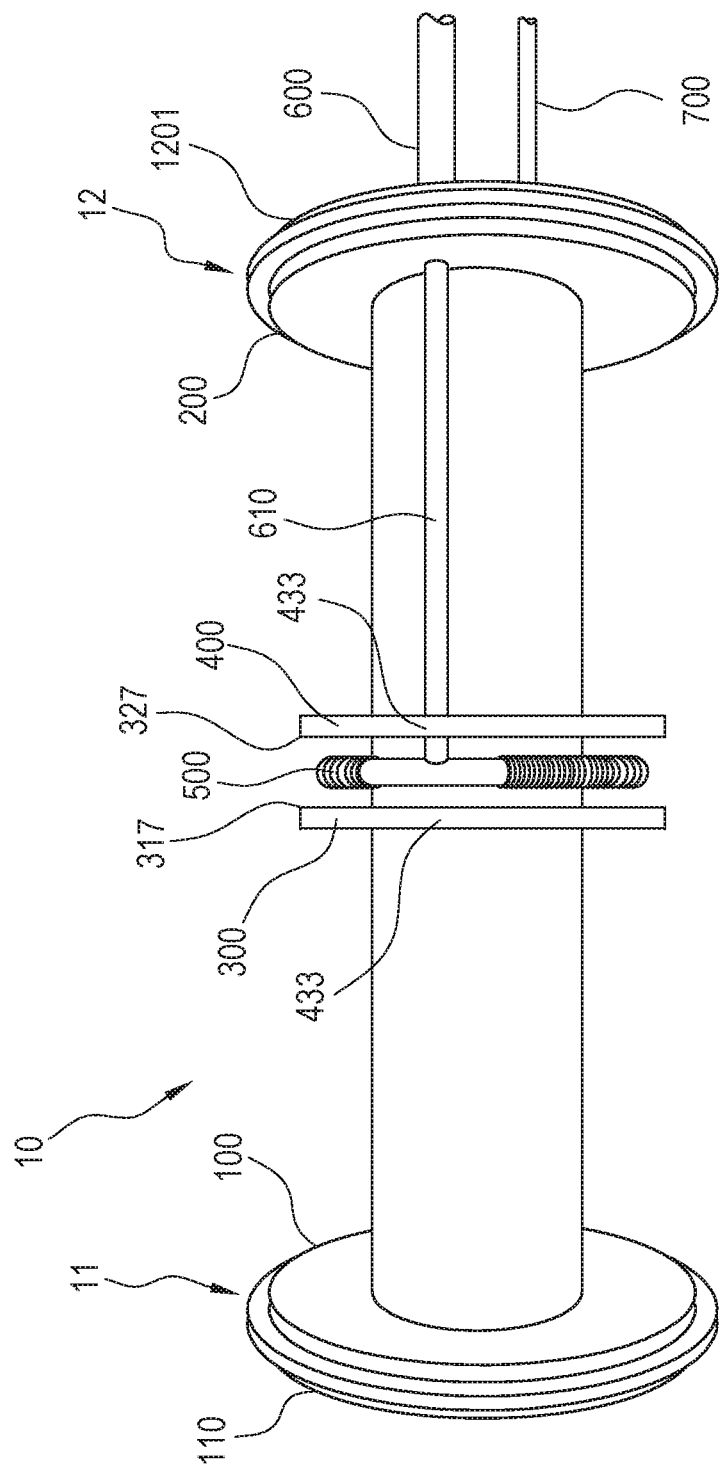
FIG. 8 is an annotated photograph of a non-limiting example of a near-weld purge rig.

FIG. 8 is an annotated photograph of a non-limiting example of a near-weld purge rig 10. The near-weld purge rig 10 has the first seal member 100 having first expandable seal 110 and the second seal member 200 having second expandable seal 1201. The near-weld purge rig 10 of FIG. 8 also has the first baffle 300 and the second baffle 400 with a gas distributor 500 having the purge gas feed line 610 fed purge gas 603 by purge gas supply line 600. The seal member expansion gas feed line 700 is also shown. In an embodiment, the first baffle 300 and second baffle 400 are circumferential disk shaped and have purge edges and radial surfaces which are complete and circumferential. FIGS. 1-7 illustrate the first baffle 300 and the second baffle 400 which are disk shaped and through which a pipe, such as the purge gas feed line 610, can penetrate. For convenience of construction, the example of FIG. 8 illustrates a radial pipe placement gap 433 in the second baffle 400 for ease of placement of the purge gas feed line 610. In another embodiment, the radial pipe placement gaps 433 shown in the first baffle 300 and the second baffle 400 can be filled, or eliminated. Alternately, the non-limiting example of FIG. 8 can be constructed as shown in FIGS. 1-7 without any radial pipe placement gap 433.

Figure 9B:
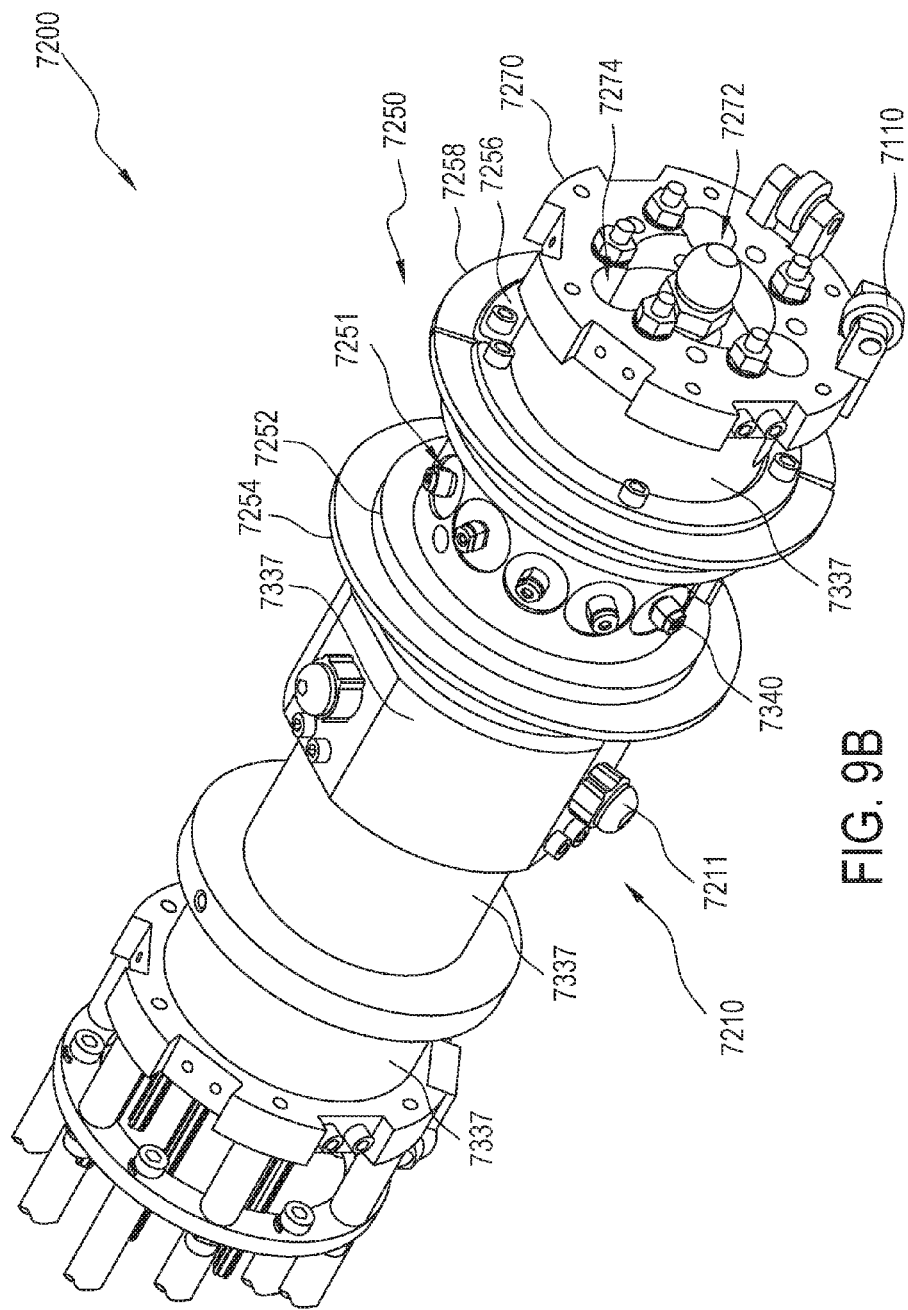
FIG. 9B is an enlarged view of the purge gas rig of FIG. 9A.

FIGS. 9A and 9B discloses a purge gas rig 7100 of another embodiment of the present invention. Rig 7100 includes an extension portion 7120 and a purge portion 7200. Extension portion 7120 includes and extender structure 7128 and an end structure 7124. Extender structure 7128 is connected to purge portion 7200 at a first longitudinal end and to end structure 7124 a second and opposite longitudinal end. Extender structure 7128 may comprise a plurality of elongated members that serve to ensure that rig 7100 is sufficiently elongated. Specifically, when rig 7100 is positioned in the pipe, the longer the total longitudinal length of rig 7100, the more closely aligned will be the longitudinal centerline of rig 7100 with respect to the longitudinal centerline of the pipe to be welded.

Regarding FIG. 9B, purge portion 7200 includes a core 7337 that extends in a longitudinal direction. Core 7337 can be generally cylindrical and support channel structures on its external side while supporting gas delivery structures on its interior side. Purge portion 7200 includes at least one expander 7210, at least one purge dam 7254, 7258, and a nozzle assembly 7250. Expander 7210 includes pipe engagers 7211 for engaging an interior of the pipe to be welded and for radially aligning purge portion 7200 in an interior of a pipe to be welded. Specifically, expander 7210 adjusts or centers nozzle assembly 7250 in the pipe such that a centerline passing longitudinally through rig 7100 and nozzle assembly 7250 is as best as possible aligned with a longitudinal centerline of the pipe. Pipe engagers 7211 are supported on and forced outward from core 7337.

Dam bases 7252 and 7256 extend radially from core 7337. Purge dams 7254 and 7258 may be supported by and extend from dam bases 7252 and 7256 respectively. Purge dams and dam bases in the present embodiment play essentially the same role as baffles 300, 400 in the previous embodiment of FIGS. 1-8. Dams 7254, 7258 can be made of any material, but a flexible material (e.g., ribber or flexible polymer) may work well and even serve to absorb any shock to rig 7100 as rig 7100 is inserted and removed from the pipe.

At a longitudinal end of purge portion 7200 is a nose connector 7270. Nose connector 7270 forms a base or support from which to connect a rig nose portion (shown and discussed in greater detail below). Nose connector 7270 may also support one or more wheel assemblies 7110 that extend at a radial periphery of rig 7100. Wheel assemblies 7110 allow rig 7100 to be supported rollably as rig 7100 is inserted into pipe interiors in a pipe longitudinal direction. Nose connector 7270 also includes multiple passages for accommodating various auxiliary supplies to purge portion 7200 from sources external to rig 7100. For example, a purge gas passage 7272 is provided for accommodating a purge gas line to supply inert gas to nozzle assembly 7250 and an oxygen passage 7274 is provided to accommodate an oxygen line (between the purge channel or purge space 7251 and an oxygen sensor 7402 discussed below) so that during a purging operation, oxygen levels in purge channel 7251 (proximate nozzle assembly 7250) are sensed to determine when welding can begin. Ports for both are discussed in greater detail below.

Figure 9C:
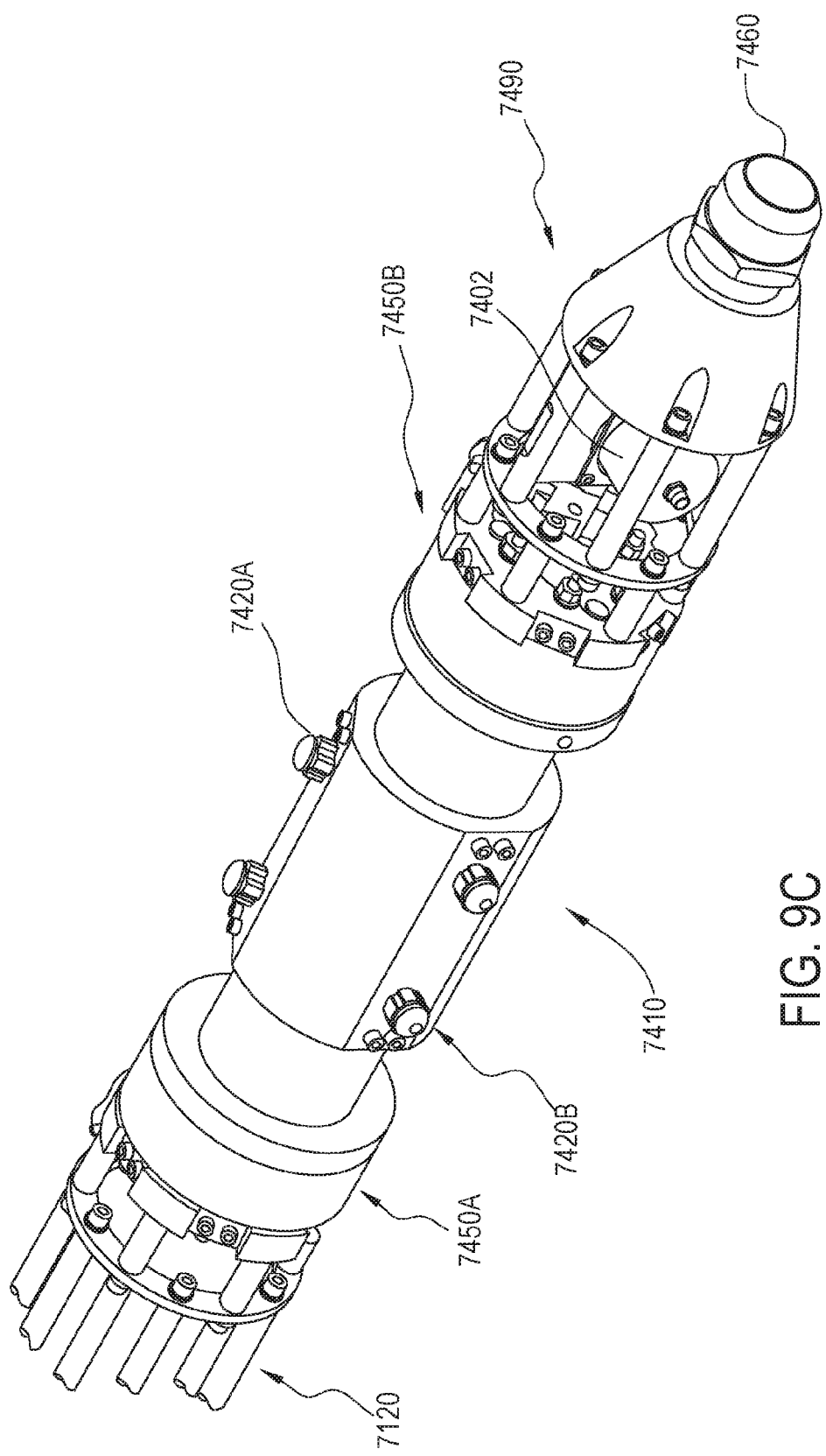
FIG. 9C is a perspective view of another embodiment of a purge gas rig of the present invention.

FIG. 9C shows an embodiment of a rig 7100 having an expander portion 7410 including multiple expanders 7420A and 7420B. During a purge process, expander 7420A extends radially to engage an interior of a first pipe end and expander 7420B extends radially to engage an interior of a second pipe end where the pipe ends are fitted together for welding. Similarly, after the expanders project radially to center rig 7100 in the pipes, inflatable seals 7450A and 7450B can be selectively, radially expanded by inflation toward a respective pipe interior surface. An individual inflation seal 7450A or 7450B may extend to the interior surface or be positioned short of the pipe interior surface. The radial extent or limit of a seal's positioning will depend on the intended pressure in and flow design of the purge chamber. Seals 7450A, 7450B may serve essentially the same purpose as baffles 300, 400 of the embodiment of FIGS. 1-8, except that the extent to which the baffles are extended is selectively variable and automatically controllable. One or both seals may not be inflated at all depending on the chose gas flow configuration. In the embodiment to FIG. 9C, nozzle assembly 7250 may be positioned between expanders 7420A and 7420B.

Also shown in FIG. 9C is nose assembly 7490. As mentioned above, nose assembly 7490 is secured to rig 7100 by nose connector 7270. Nose assembly 7490 supports accessories necessary to perform the purge process. For example, nose assembly 7490 may house an oxygen sensor 7402. When oxygen sensor 7402 is housed in nose assembly 7490, an oxygen line is connected between oxygen sensor 7402 and purge channel 7251. The oxygen line (not shown) passes through oxygen passage 7274 terminating in purge channel 7251. Oxygen in purge channel 7251 can then travel through the oxygen line to oxygen sensor 7402 which generates a signal representative of an oxygen concentration (e.g., 50-200 ppm) in purge chamber 7251. The signal is then sent (e.g., periodically) to a processor or electronic controller for further process when the purge process is handled automatically or shown on a display in the case where a user is conducting the purge process manually. When the purge process is operated automatically, the inert gas may begin to flow to the purge channel to reduce the air and oxygen concentration, and a sensor may then eventually signal that a maximum allowable oxygen concentration is reached and an acceptable oxygen level is exists to allow effective welding to begin.

Other supply accessories (e.g., electric power, pressurized air, electronic communication data, etc.) may gain access through nose opening 7460. Furthermore, a reach rod (not shown) may be connected thereto for positioning rig 7100 in the pipe. Accessory lines to the external supplies may pass along and be supported by the reach rod.

Figure 10:
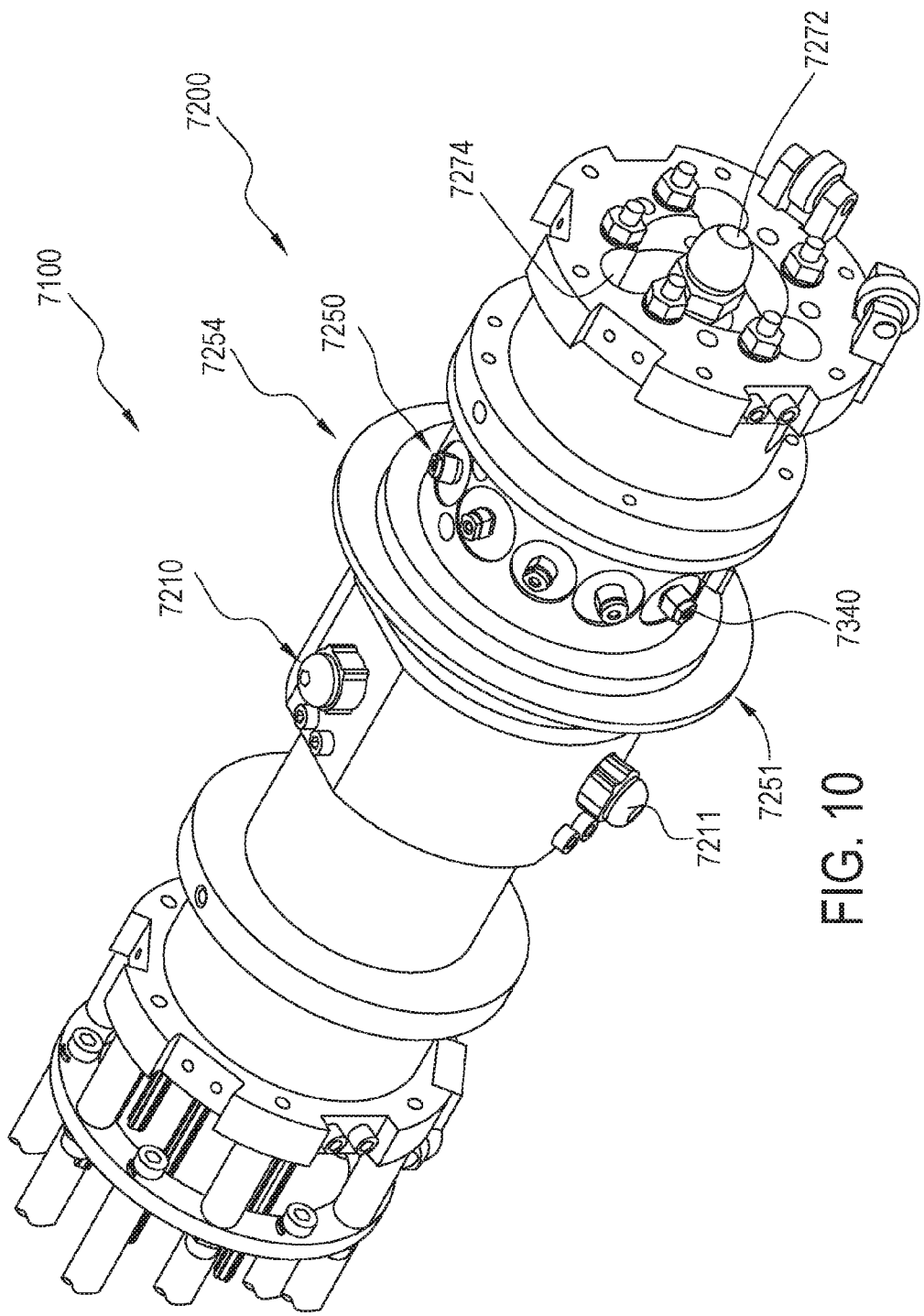
FIG. 10 is an enlarged perspective view of a portion of the purge gas rig of FIG. 9A.

FIG. 10 shows an embodiment of rig 7100 having a purge channel design in which only one purge dam 7254 is present. Inert gas dispersed from nozzles 7340 into purge gas channel 7251 encounters purge dam 7254 which serves as a barrier or partial barrier to gas flow toward end structure 7124. Since no barrier equivalent to purge dam 7254 exists on an opposite side of nozzles 7340, gas from nozzles 7340 floods purge channel 7251 and then flows through the pipe primarily in the longitudinal direction toward nose cone 7490 and then out of the pipe.

Figure 11:
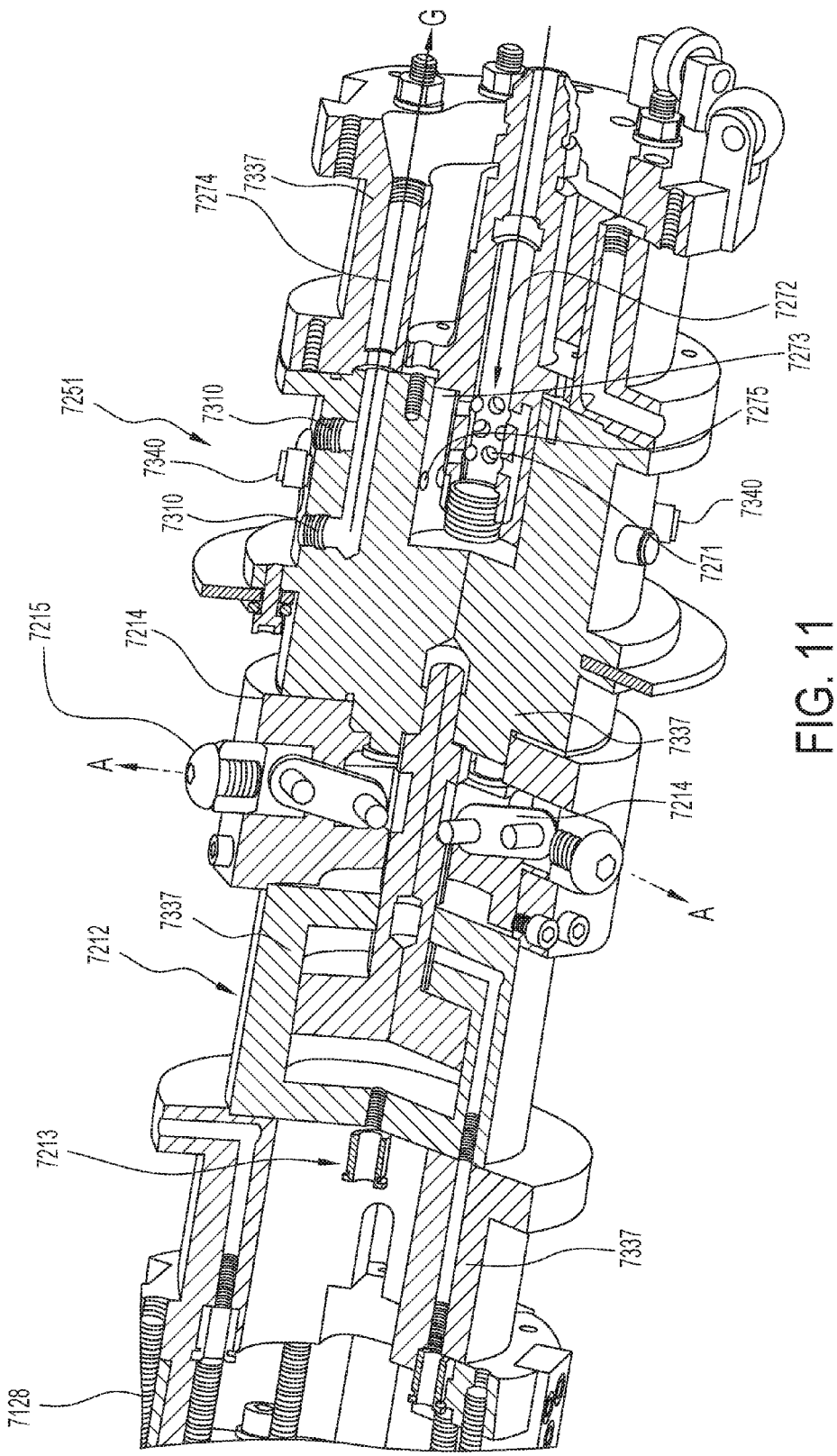
FIG. 11 is an enlarged cut away view of the purge gas system of the purge gas system of FIG. 9A.
Figure 12:
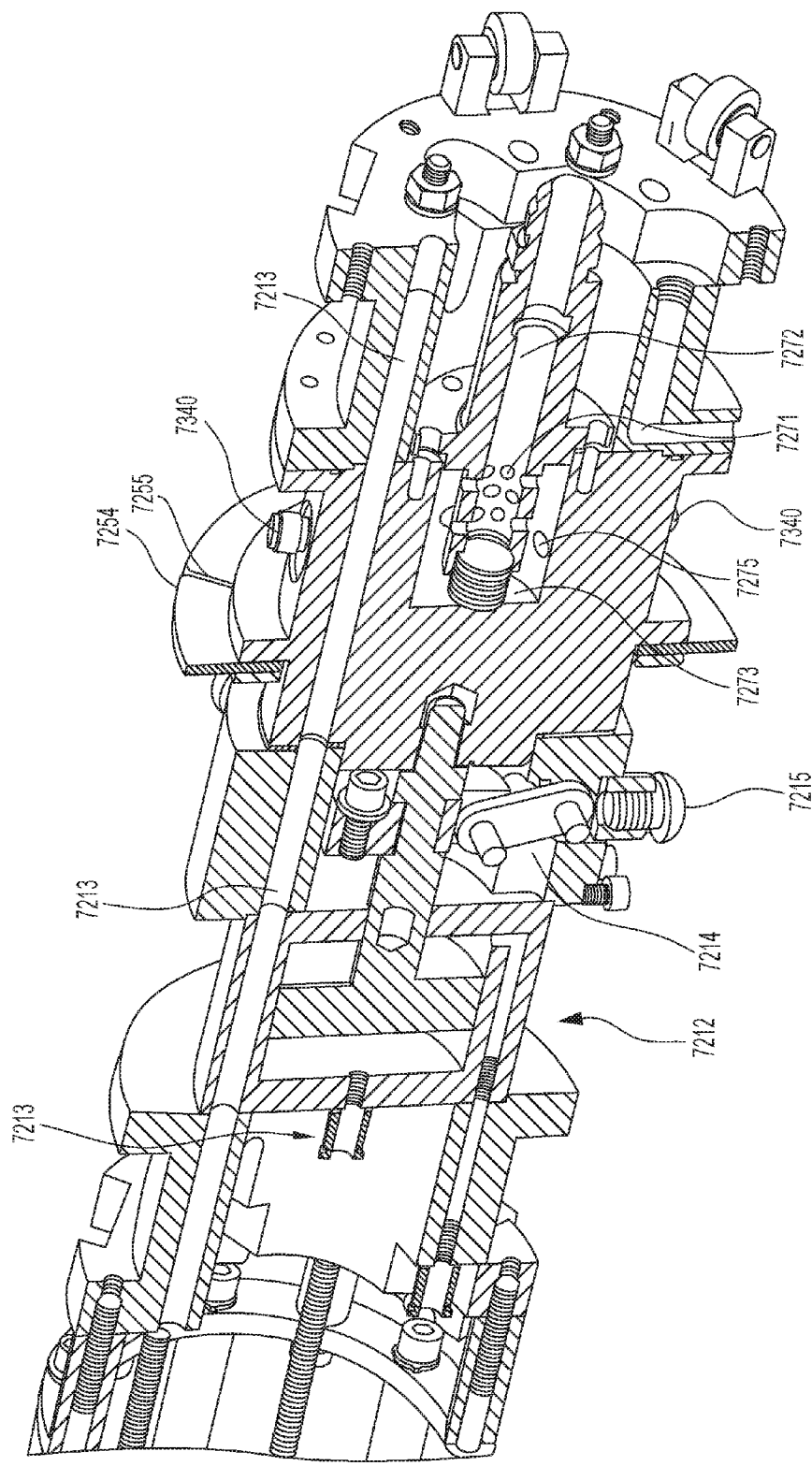
FIG. 12 is an enlarged cross-sectional view of the purge gas system of FIG. 9A.

FIGS. 11 and 12 show cross sectional views of rig 7100 exposing a number of its interior features. Piston/cylinder 7212 is shown which receives pressurized air from a supply (not shown, but similar to 7070 of FIG. 23 described below) and through a linkage system 7214 forces expander tips 7215 radially outward in an A direction. FIG. 11 also shows purge channel 7251 and nozzles 7340 which extend into purge channel 7251. Furthermore, oxygen passages 7310 are shown in communication with purge channel 7251 on either side longitudinally of nozzles 7340 and connected to oxygen supply passage 7274. Also shown are the internal workings/passages 7272 of purge gas supply and how purge gas passage 7272 extends from a port external to rig 7100 to nozzles 7340. After entering passage 7272, purge gas may be dispersed into a supply reservoir 7273 via holes or passages 7271 in an interior end of passage 7272, supply reservoir 7273 is proximately longitudinally aligned with nozzle assembly 7250. A plurality nozzle supply passages 7275 are provided between supply reservoir 7273 and each nozzle 7340 so that gas may communicate between supply reservoir 7273 and each nozzle 7340. While inert gas may be supplied from an external source, an onboard gas supply positioned on rig 7100 may also be provided (e.g., in nose 7490 or elsewhere) as discussed below.

FIG. 12 further shows an expander air passage 7213 through which expander supply air may pass from nose cone 7490 through to piston/cylinder 7212 to provide pressurized air to operate expanders 7211, 7420A and 7420B. While a separate supply may be provided for expander air, gas from another system (e.g., purge gas) may be used if convenient. When multiple systems utilize a single gas source, each system may include its own air regulation system between it and the common air supply. Purge dam 7254 may include circumferencially space gaps 7255. Gaps 7255 may provide additional flexibility when purge dam 7254 engages an interior surface of a pipe.

FIGS. 13A and 13B will now be described. FIG. 13A shows a cross-sectional view of purge channel 7251 through nozzles 7340 and looking toward end structure 7124. At a center of FIG. 13 is purge gas passage 7272. Purge gas flows from passage 7272 to a purge gas hub 7273 via purge gas passage openings 7271. From purge gas hub 7273 gas travels through nozzle supply passages 7275 to a plurality of nozzles 7340 which are directed radially outward and through which gas is discharged in a generally cone shape spray pattern 7350. Gas from nozzle 7340 is directed or forced radially outward onto portions of interior surfaces of two pipe ends 1022a, 1022b (i.e., the weld area) that are fitted up for internal or external welding. In the embodiments of FIGS. 9-14, the positioning/arrangement of nozzles 7340 with respect to the seam or fit-up of pipes 1022a, 1022b is generally similar to the positioning of the gas distributor 500 to the pipe gap 505 or fit-up of the embodiment of FIGS. 1-8. Therefore, the terminology and description of the embodiment of FIGS. 1-8 may also be used for the embodiment of FIGS. 9-14. While multiple individual nozzles are disclosed which each project gas in a cone-shaped spray pattern, this disclosure contemplates a single dispersion nozzle that directs gas radially outward along the entire circumference of the gap in a v-shape pattern.

The distance from the tip of nozzles 7340 (where cone 7350 begins) to the interior surface of the pipe (where cone 7350 ends with a generally circular or oval-type surface projection) and the geometry (e.g., flared or cone shape) of the spray pattern is chosen so that gas spray from one nozzle 7340 creates an overlap 7354 of spray from each adjacent nozzle on each respective side of the nozzle 7340. FIG. 13B shows a side view cross-section of pipe 1022a and 1022b exposing an inner surface on which is superimposed a projected spray pattern. In addition, FIG. 13B shows the portion of the interior surface where spray 7350 experience an overlap 7354 defined as an intersection between surface projections of adjacent spray patterns. A width of each overlap may be greater than or equal to a width of the weld surface area to be cooled. Overlap 7354 insures that every circumferential portion of the interior surface of the abutment between the two pipe ends receives at least a minimum supply or distribution of cooling gas. In addition spray gap 7339 represents the distance between the end of nozzle 7340 and an interior surface 7341 of pipes 1022a, 1022b. Spray gap 7339 may be about 0.5 inches but could effectively cool surface 7341 at a distance of between 0.0 and 1.5 inches or more if a nozzle exists that can deliver the gas to the surface at a higher distance.

In FIG. 13 dam base 7252 can be seen behind the heads of nozzles 7340. Radially extending out from dam base 7252 is purge dam 7254 which extends further out into spray gap 7339 than dam base 7252. As discussed above, air passage 7213 extends through rig 7100 to supply piston/cylinder 7212 with air for expanders. Oxygen passage 7274 extends from nose cone 7490 to purge gas channel 7251.

The supply of inert gas to the weld area and torch area as described above serves at least two advantageous purposes. First, as mentioned above, superimposing the rig's purge gas channel 7251 over or within the pipe joint's weld area simultaneously displaces ambient air from the weld area as it displaces gas from the rig's purge gas channel 7251. This lowering of the concentration of oxygen that the weld is exposed to prevents excessive oxygen from corrupting the structure of the welded area of the pipe. Second, during welding when nozzles 7340 direct gas at the interior pipe joint surface in the manner described above, the gas can cool the weld material preventing it from puddling or running. This cooling can provide an effective way of controlling metal flow at the weld. Such control can be especially important on vertical weld runs of the pipe interface where the weld heated metal is most susceptible to gravitational forces. The gas flowing over the pipes' interior surface may remove sufficient heat from the metal in the torch area by convection heat transfer to inhibit or prevent undesirable metal flow.

Convection heat transfer can be described generally by the well known equation, $$Q_{convection} = (h_{conv})(A_{sur})(T_{sur} - T_{gas}), \text{ where}$$

$Q_{conv}$ is he rate of convection heat transfer from the pipe to the air;

$h_{conv}$ is the coeffiecent of convection heat transfer;

$A_{sur}$ is the surface area of the pipe from which heat is removed;

$T_{sur}$ is the temperature of the pipe surface from which heat is removed; and $T_{gas}$ is the temperature of the gas that contacts the pipe surface.

The heat transfer coefficient increases as the velocity of the gas increases and decreases as the velocity of gas decreases. Therefore, the amount of heat that is removed from the heated inner surface of the pipe can be adjusted by adjusting the gas flow rate through nozzles 7252. The temperature of the gas can also be increased or decreased. With a reduced supply gas temperature more heat can be removed with the gas flow rate kept constant.

As discussed above, there are number of design parameters that may be adjusted in an attempt to optimize the speed and quality of a weld operation. The present disclosure contemplates adjusting these various parameters (e.g., distance of nozzle tip from pipe interior (i.e., spray gap), pressure/flow rate of supply gas, temperature of supply gas, shape of gas nozzle spray pattern, etc.) in order to dictate weld process characteristics and results. Furthermore, such adjustments may be conducted manually by a user or automatically by an electronic control system.

Manual Purge Operation

Figure 14A:
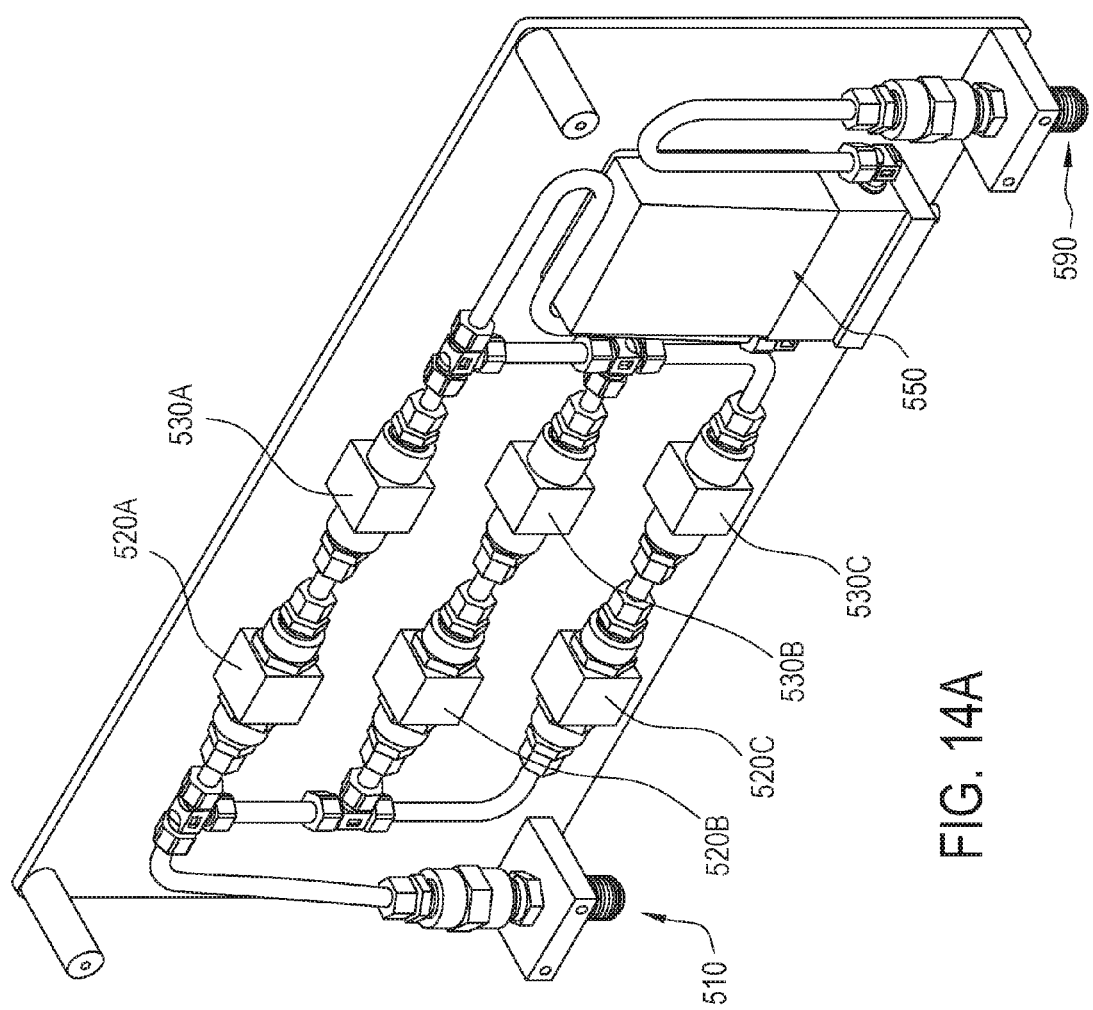
FIG. 14A is a rear view of a manual control board of the purge gas rig of FIG. 9A.

FIGS. 14A and 14B respectively show a rear and front side of a manually operated gas supply and regulation system. Gas from a pressurized container (e.g., tank—not shown) is connected to intake 590 which then passes through a sensor 550 that senses flow rate and may be able to sense other gas properties (e.g., temperature, pressure, etc.). From the sensor a line communicates with and distributes gas to multiple parallel supply lines. Each supply line includes a flow valve 530A-C associated with a corresponding valve actuator 560A-C for controlling the flow rate of the gas through its respective line. Each supply line also includes (in series) an on/off valve 520A-C and its respective actuator 570A-C by which an operator can selectively choose whether gas will or will not flow through a respective line. Gas exiting any of the parallel lines will pass through a common line and then through a discharge fitting 510.

In operation, before welding begins, an operator will sometimes want to preset multiple gas supply conditions. For example, the operator may want to begin the purge process with one gas flow rate and maintain that flow rate until a specific condition is reached (e.g., arriving at predetermined oxygen concentration in gas purge channel 7251). This first condition may signal that welding can begin. The operator may then want to supply a second gas flow rate to the purge gas channel 7251 when a second condition is reached (e.g., the weld gap is significantly closed). Finally, the operator may want to supply a third flow rate to purge gas channel 7251 at the very end of the weld process (e.g., the weld gap is almost complete).

To preset for the above mentioned conditions, an operator may turn on the main valve to the gas supply container (not shown). The gas is then available at intake 590 to be distributed through on/off valves 520A-C. For example, 570A can be opened and then 560A can be used to adjust the flow therethrough (i.e., via consultation with sensor 550) to the desired gas flow rate corresponding to the first above condition (i.e., reaching of predetermined oxygen level or low flow). Similarly, 570A can be closed off in order to independently adjust a flow rate through using 570B and 560B for a second condition (e.g., medium flow). Finally, 570C and 560C can be adjusted for a third condition (e.g., high flow). When 570A-C are shut off and 560A-C are preset as described above, the manual system is ready for the examiner to open the appropriate one of on/off valves 570A-C to get the appropriate desired flow rate delivered to supply outlet 510.

Automatic Purge Operation

While the above description and operation of the features of FIGS. 14A and 14B are directed toward an operator manipulated manual control process, the purge gas process described above may be handled automatically. Patent Application No. PCT/US2015/22665, filed on Nov. 24, 2015 describes a purge gas mechanism that includes a number of automatically functioning features. Patent Application No. PCT/US2015/22665 is incorporated herein by reference in its entirety.

Figure 18:
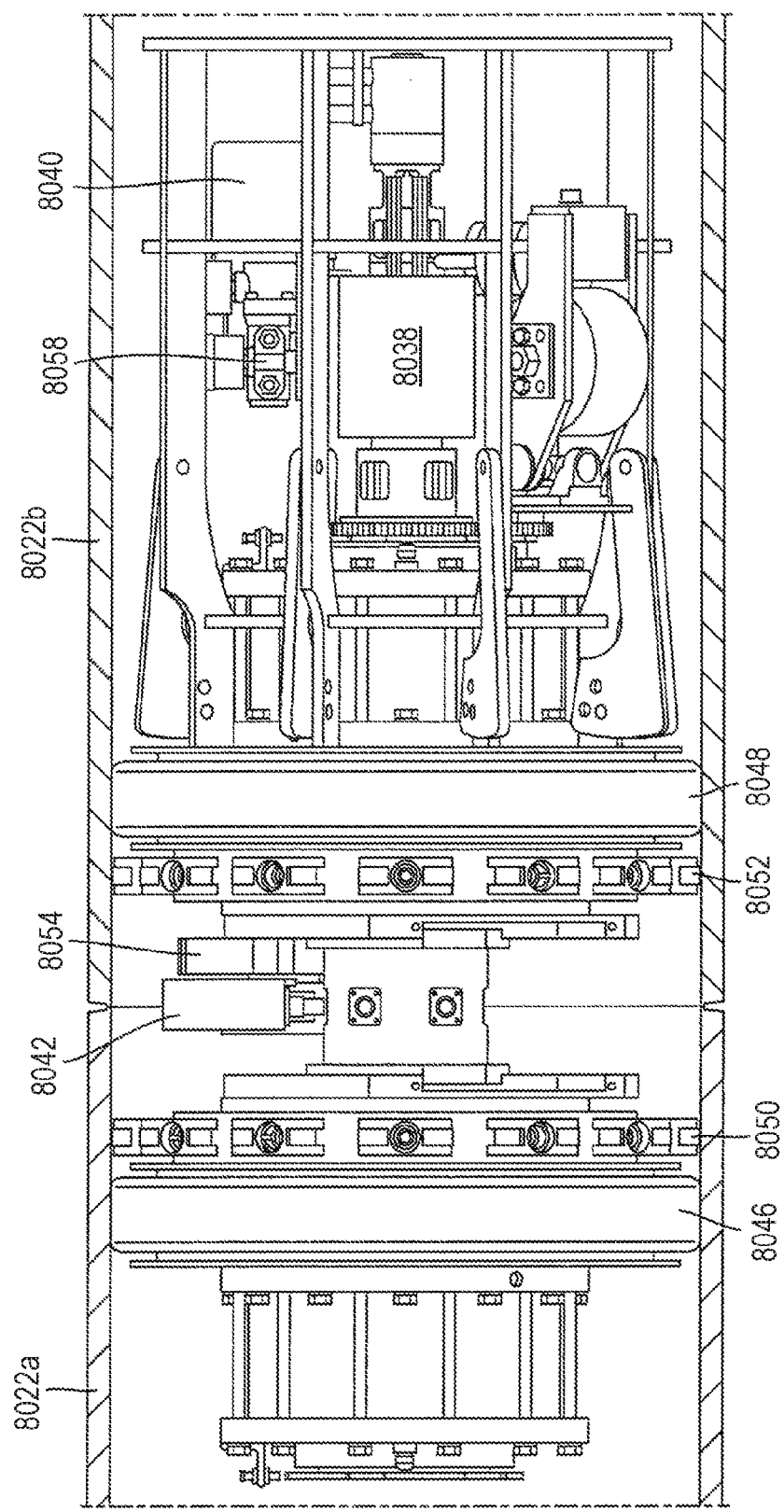
FIGS. 18 and 19 show a front view and a cross-sectional view of a center section of the purge and inspection system in accordance with an embodiment of the present patent application.
Figure 26:
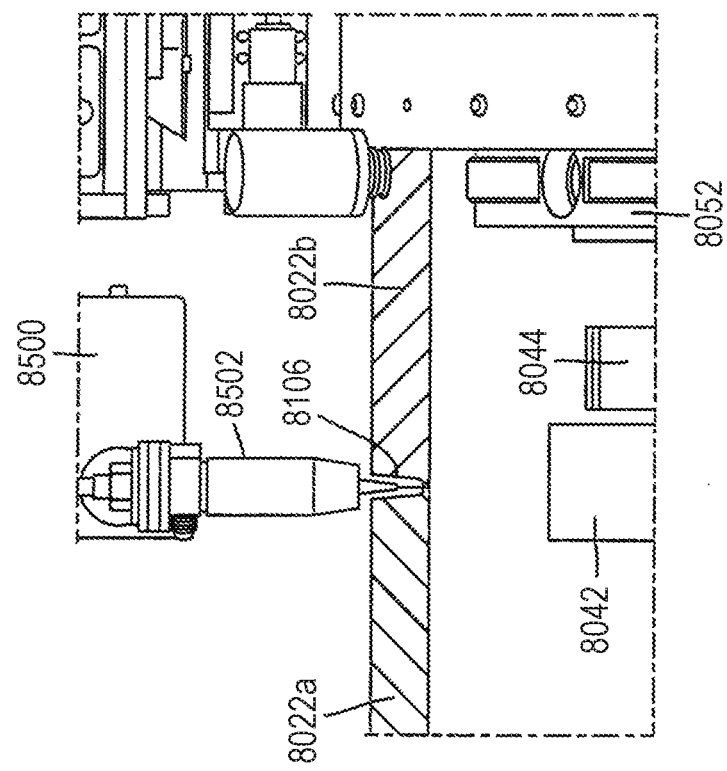
FIG. 26 shows a partial view of the purge and inspection system in accordance with an embodiment of the present patent application.

In one embodiment, referring to FIG. 15, the present patent application provides the purge and inspection system 8001. For example, in one embodiment, the first pipe segment 1022a and the second pipe segment 1022b each may be made completely or in-part from some Corrosion Resistant Alloy (CRA) materials that may require shield gas on both sides of the weld. In one embodiment, the purge and inspection system 8001 may be positioned internally within the pipes 1022a, 1022b to provide a purge gas chamber 8054 (as shown in FIG. 18) inside the pipes 1022a, 1022b and around an interface region (as shown in FIG. 26), while an external weld system 8500 (as shown in FIG. 26) performs the welding procedure (including a root pass weld procedure, a hot pass weld procedure and a fill and cap weld procedure) at an interface region from outside the pipes 1022a, 1022b.

In one embodiment, the purge and inspection system 8001 also provides internal clamps that are positioned internally within the pipes 1022a, 1022b to be welded. That is, in one embodiment, clamps 8050 and 8052 of the purge and inspection system 8001 are configured to clamp the inner surfaces of pipes 1022a, 1022b to be welded.

In one embodiment, the purge and inspection system 8001 also provides inspection detector 8042 and/or inspection camera 8044 that are positioned internally within the pipes 1022a, 1022b. In one embodiment, the inspection detector 8042 and/or inspection camera 8044 of the purge and inspection system 8001 are positioned in the purge gas chamber 8054 of the purge and inspection system 8001. In one embodiment, one or more processors 8062 (as shown in FIG. 90) of the purge and inspection system 8001 are configured to interact with the inspection detector 8042 and/or inspection camera 8044 to scan the interface region between the pipes 1022a, 1022b to determine the profile of the interface region between the pipes 1022a, 1022b prior to, during and subsequent to the welding procedure, to generate pre-weld profile data, on-the-fly weld profile data, and post-weld profile data based on the scanned data, and to control the external weld system 8500 or its operation based on the generated pre-weld profile data, on-the-fly weld profile data, or post-weld profile data.

In one embodiment, the purge and inspection system 8001 may be used for the first pipe segment 1022a and the second pipe segment 1022b having an external diameter of 26 to 28 inches. In one embodiment, the purge and inspection system 8001 may be used for the first pipe segment 1022a and the second pipe segment 1022b having an external diameter of less than 24 inches.

In one embodiment, the purge and inspection system 8001 includes a forward-most section 8002, a center section 8004 and a drive section 8006.

The center section 8004 may not include the weld torch assembly mounted on its rotatable hub. In one embodiment, the center section 8004 of the purge and inspection system 8001 includes the inspection detector 8042 mounted on its rotatable hub 8012. In one embodiment, the center section 8004 of the purge and inspection system 8001 includes the inspection detector 8042 and the inspection camera 8044 mounted on its rotatable hub 8012. In one embodiment, the center section 8004 of the purge and inspection system 8001 includes the inspection camera 8044 mounted on its rotatable hub 8012.

In one embodiment, the forward-most section 8002 houses all of the purge support components. In one embodiment, the center section 8004 is the part of the purge and inspection system 8001 that aligns the pipe, seals the purge area, and inspects the weld. In one embodiment, the drive section 8006 houses the batteries, compressed air and purge gas that the rest of the purge and inspection system 8001 needs to operate.

Figure 16:
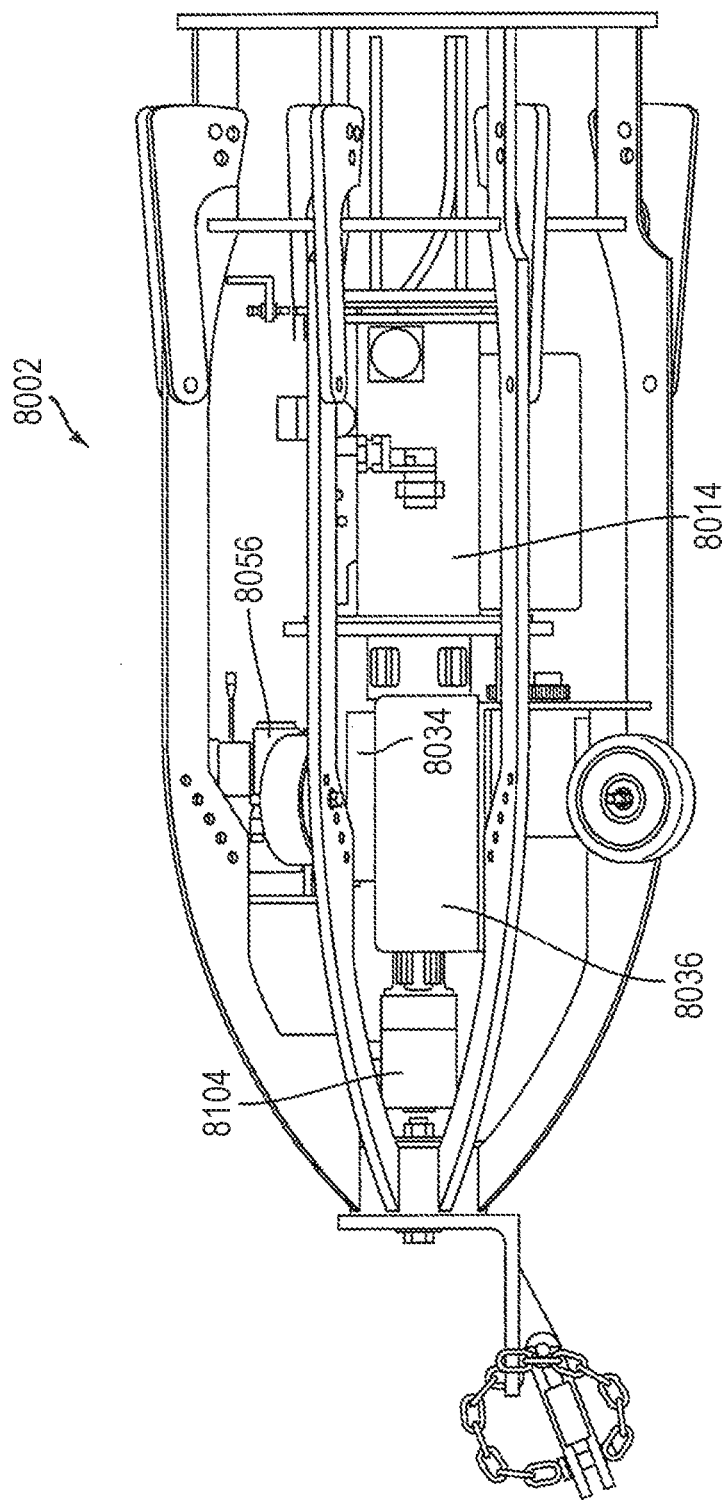
FIG. 16 shows a detailed view of a forward-most section of the purge and inspection system in accordance with an embodiment of the present patent application.
Figure 17:
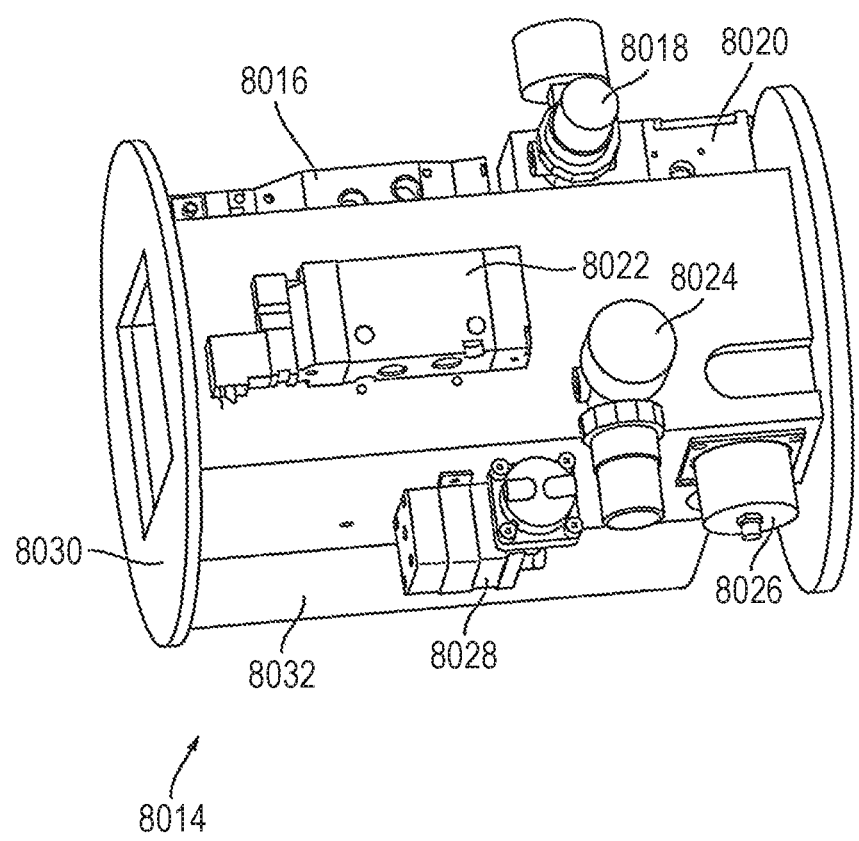
FIG. 17 shows a purge assembly of the purge and inspection system in accordance with an embodiment of the present patent application.

FIG. 16 shows a detailed view of the forward-most section 8002 of the purge and inspection system 8001 and FIG. 17 shows a detailed view of a purge assembly of the forward-most section 8002. In one embodiment, the forward-most section 8002 of the purge and inspection system 8001 includes a tow hitch, a forward-most electronics module, a front slip ring, a front clamp control valve, a front position sensor, adjustable ramps, a forward-most section frame, guide wheels, a front rotation motor, and a front rotary union 8104.

In one embodiment, the forward-most section 8002 of the purge and inspection system 8001 does not include a wire feed assembly. Instead, the forward-most section 8002 of the purge and inspection system 8001 includes the purge assembly 8014.

In one embodiment, the purge assembly 8014 is rotatably connected to the rotatable hub 8012 of the center section 8004 such that, when the rotatable hub 8012 is rotated by the first and second rotation motors, the purge assembly, connected to the rotatable hub 8012, also rotates with the rotatable hub 8012.

In one embodiment, the purge assembly 8014 is configured to house valves, sensors, and regulators to control the flow of purge gas into the purge gas chamber 8054. In one embodiment, the purge assembly 8014 is also configured to house the electronics for operating all of the components in the purge assembly and the rotatable hub 8012.

In one embodiment, referring to FIG. 17, the purge assembly 8014 includes a low purge valve 8016, a primary low purge regulator 8018, a secondary low purge regulator 8020, a high purge valve 8022, a high purge regulator 8024, an oxygen sensor 8026, a pump 8028, a purge assembly frame 8030, and a purge electronics module 8032.

In one embodiment, the low purge valve 8016 is configured to control the flow of purge gas into the purge gas chamber 8054. In one embodiment, low purge is generally referred to as a purge when the purge and inspection system 8001 is maintaining the inert atmosphere inside the purge gas chamber 8054. In one embodiment, output from the low purge valve 8016 goes to the primary low purge regulator 8018. In one embodiment, the low purge valve 8016 is always open (or on) except when seals 8046 and 8048 (as shown in FIG. 18) are not inflated and there is no purging in the purge and inspection system 8001.

In one embodiment, the primary low purge regulator 8018 is configured to reduce the pressure of the purge gas from the pressure of 5 psi down to the pressure of 0.5 psi. In one embodiment, the output from the primary low purge regulator 8018 goes to the secondary low purge regulator 8020. In one embodiment, the primary low purge regulator 8018 is configured to be manually set.

In one embodiment, the secondary low purge regulator 8020 is an electronic device that is configured to control the pressure (between 0.1 and 0.5 psi) of the purge gas flowing into the purge gas chamber 8054 through a closed-loop feedback. In one embodiment, the output from the secondary low purge regulator 8020 goes to the purge gas chamber 8054.

In one embodiment, the high purge valve 8022 is configured to control the flow of purge gas into the purge gas chamber 8054. In one embodiment, high purge is generally referred to as a purge when the purge and inspection system 8001 is establishing the inert atmosphere inside the purge gas chamber 8054. In one embodiment, the output from the high purge valve 8022 goes to the high purge regulator 8024. In one embodiment, the high purge valve 8022 is configured to shut off when the oxygen (as measured by the oxygen sensor 8026) in the purge gas chamber 8054 is below a predetermined oxygen content value.

In one embodiment, the high purge regulator 8024 is configured to reduce the pressure of the purge gas from the supply pressure (up to 75 psi) down to the maximum desired low purge pressure (typically 5-20 psi). In one embodiment, output from the high purge regulator 8024 goes to the purge gas chamber 8054. In one embodiment, the high purge regulator 8024 is configured to be manually set. In one embodiment, the high purge regulator 8024 is configured to be open or operational until the oxygen (as measured by the oxygen sensor 8026) in the purge gas chamber 8054 is below the predetermined oxygen content value.

In one embodiment, the oxygen sensor's 8026 input is connected to an exit port of the purge gas chamber 8054. In one embodiment, the oxygen sensor 8026 is operatively connected to the one or more processors 8062. In one embodiment, the oxygen sensor is configured to detect an amount of oxygen between the first seal and the second seal 8046 and 8048. In one embodiment, the oxygen sensor 8026 is configured to measure oxygen content of the gas in the purge chamber 8054 and to send an oxygen content data, which is indicative of the oxygen content of the gas in the purge chamber 8054, to the one or more processors 8062. In one embodiment, the oxygen sensor 8026 is configured to measure the level of oxygen present in the gas leaving the purge gas chamber 8054 and send the oxygen content data to the purge electronics module 8032.

In one embodiment, the one or more processors 8062 are configured to enable the welding operation after the amount of oxygen between the first seal and the second seal 8046 and 8048 is below a threshold level or predetermined oxygen content value. In one embodiment, the one or more processors 8062 are configured to receive the oxygen content data, compare the received oxygen content data to its predetermined oxygen content value, and generate an excess oxygen gas signal if the oxygen content data is greater than the predetermined oxygen content value. In one embodiment, based on the excess oxygen gas signal, the purge and clamp system 8100 may be configured to open the high purge regulator 8024 to allow purge gas (from the purge gas source/tank 8070) to flow into the purge chamber 8054 until the measured oxygen content falls below the predetermined oxygen content value. In one embodiment, based on the excess oxygen gas signal, the one or more processors 8062 of the purge and clamp system 8100 may send communication signals to the external weld system 8500 to stop the welding procedure.

In one embodiment, the predetermined oxygen content value is 500 parts per million (ppm). In one embodiment, the oxygen content value may be within a predetermined range of 50 to 100 ppm.

In one embodiment, during the low purge, the low pressure in the purge gas chamber 8054 does not generate sufficient flow through the oxygen sensor 8026. In one embodiment, the pump 8028 is used to draw the gas through the oxygen sensor 8026 from the purge gas chamber 8054. In one embodiment, the pump 8028 may be used continuously or intermittently. In one embodiment, the pump 8028 is used for the low purge operation.

In one embodiment, the purge electronics module 8032 is configured to pass communications upstream through the front slip ring 8034 to the forward-most section electronics module 8036. In one embodiment, the purge electronics module 8032 is configured to pass communications downstream through the rear slip ring 8038 to the center section electronics module 8040.

In one embodiment, the purge electronics module 8032 is configured to control all of the sensors and valves attached to the rotatable hub 8012 of the center section 8004. For example, in one embodiment, the purge electronics module 8032 is configured to control the oxygen sensor 8026, the pump 8028, the low purge valve 8016, the high purge valve 8022 and the secondary low purge regulator 8020. In one embodiment, the purge electronics module 8032 is configured to communicate with and control the one or more inspection detectors 8042 and the camera 8044.

Figure 19:
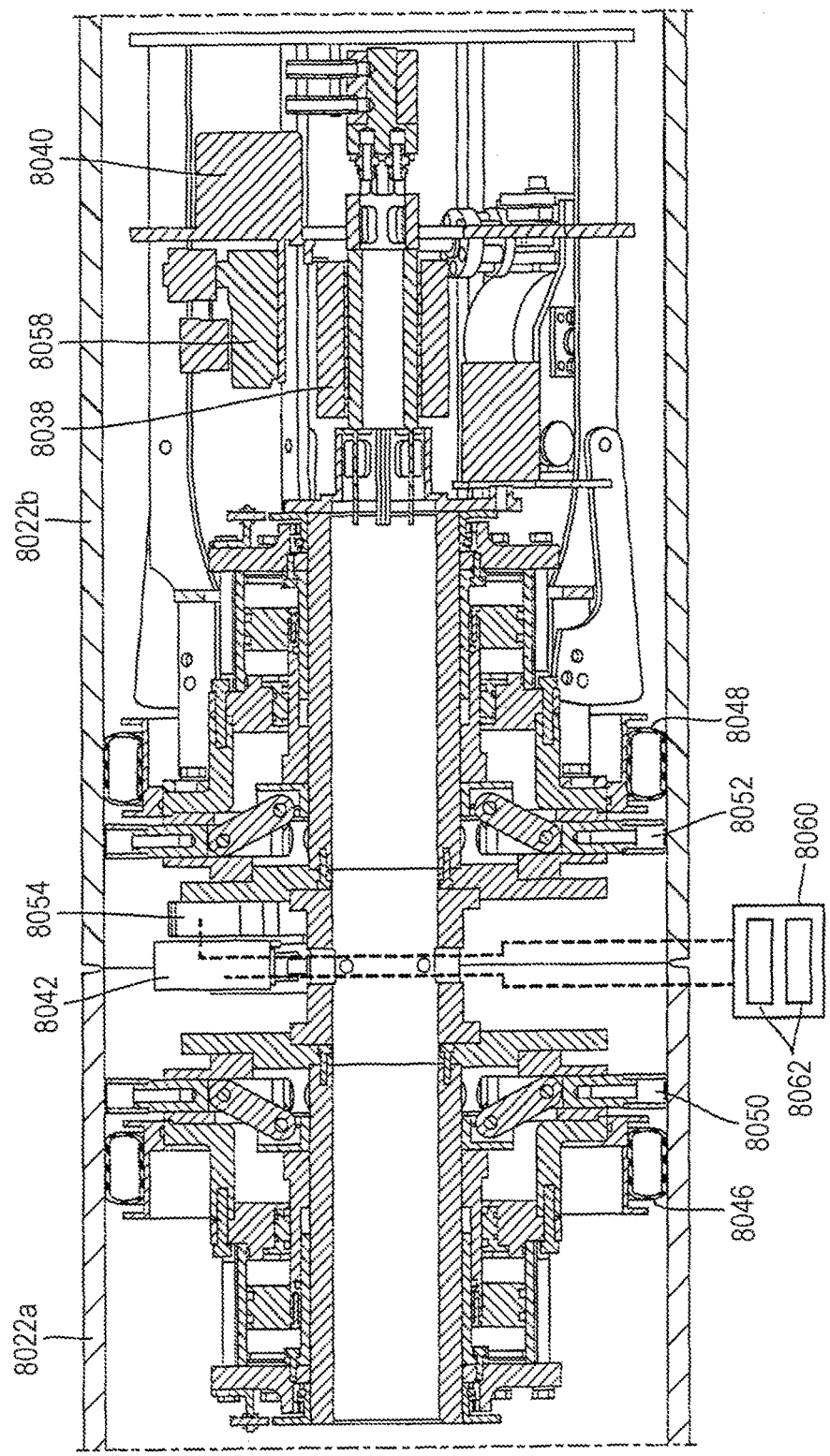
Figure 20:
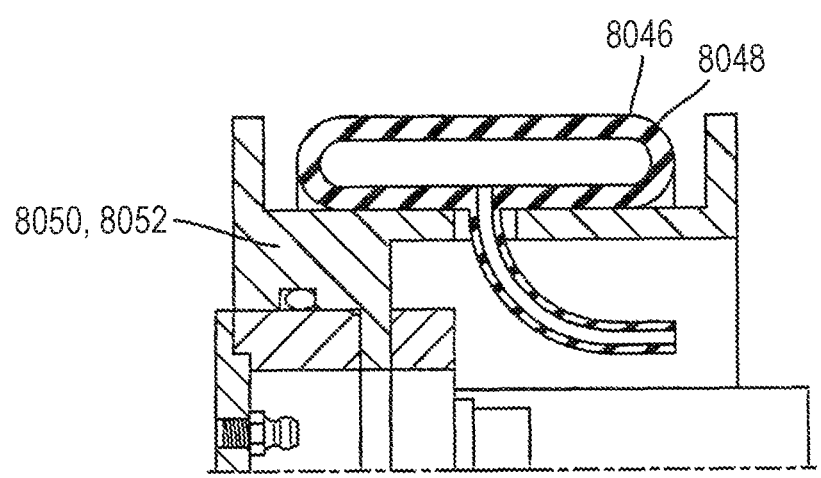
FIG. 20 shows purge seals of the purge and inspection system in accordance with an embodiment of the present patent application.

FIGS. 18 and 19 show a front view and a cross-sectional view of the center section 8004 of the purge and inspection system 8001, and the structure and operation of each of these components. FIG. 20 shows a detailed view of purge seal 8046 or 8048 and FIG. 21 shows a detailed view of the rotatable hub 8012.

Figure 24:
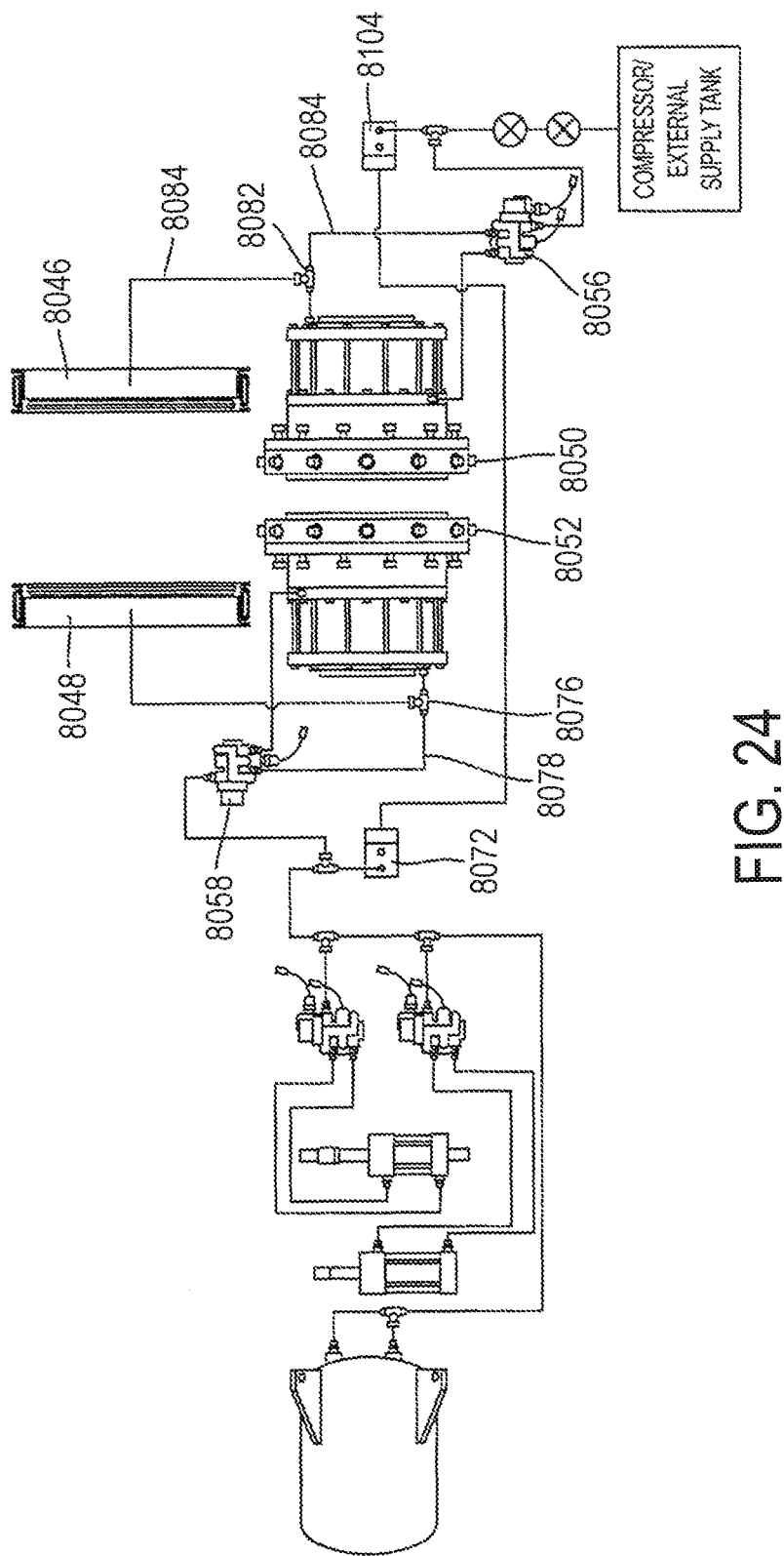
FIG. 24 shows a schematic diagram showing the flow of compressed air through the purge and inspection system in accordance with an embodiment of the present patent application.
Figure 25:
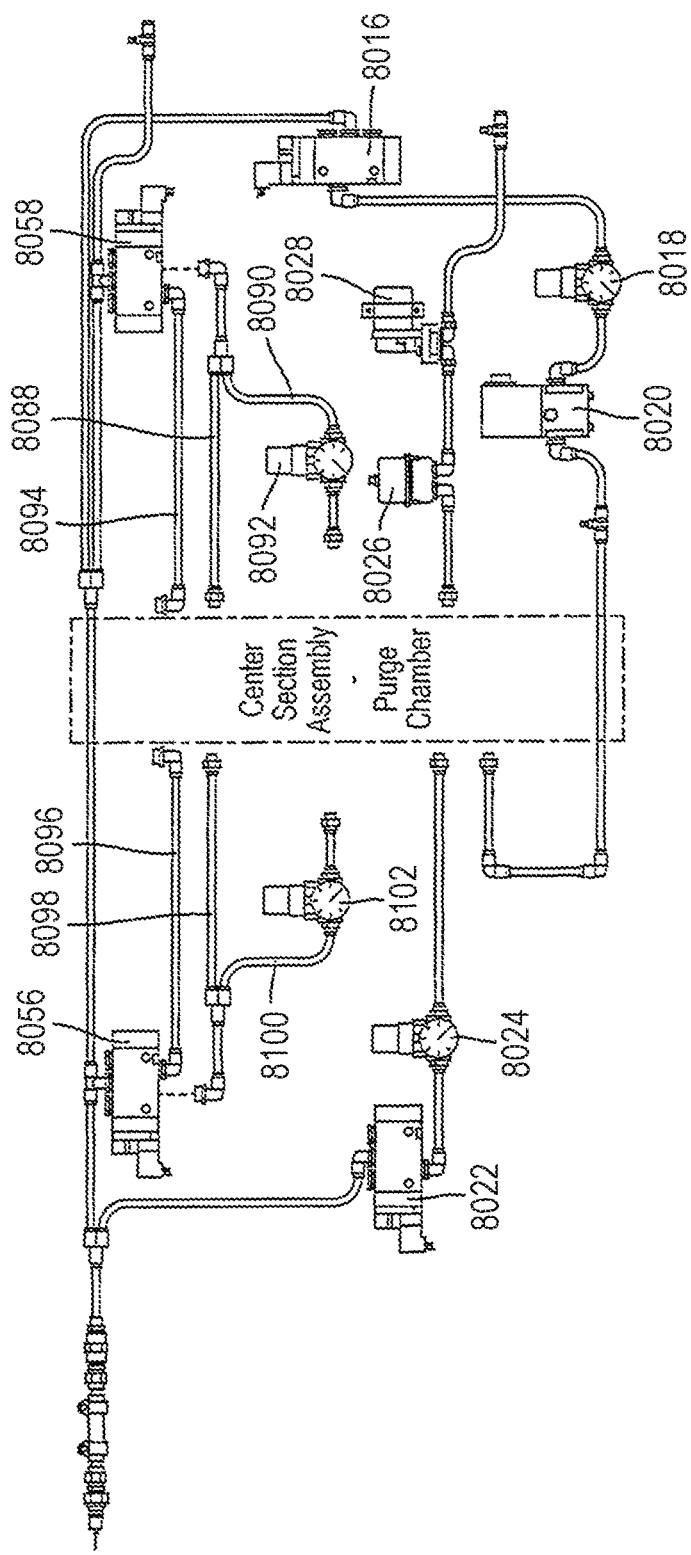
FIG. 25 shows a schematic diagram showing the flow of purge gas through the purge and inspection system in accordance with another embodiment of the present patent application.

In one embodiment, as discussed above, the frame of the forward-most section 8002 is connected to the front clamp 8050 (as shown in FIG. 24) of the center section 8004, and the purge assembly 8014 is rotatably connected to the rotatable hub 8012.

Figure 21:
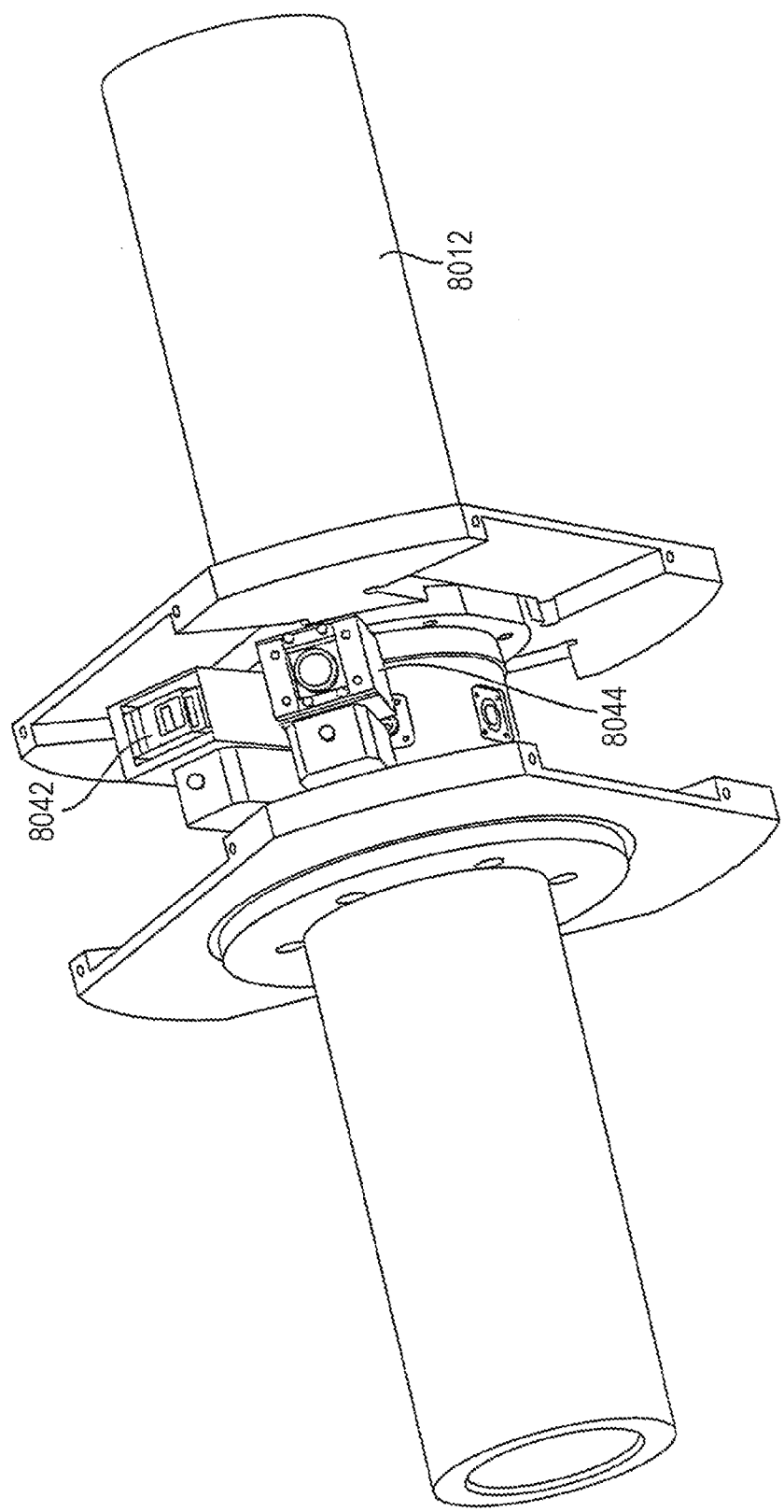
FIG. 21 shows of the rotatable hub of the purge and inspection system in accordance with an embodiment of the present patent application.

In one embodiment, the center section 8004 of the purge and inspection system 8001 includes the front clamp 8050, a first and second pipe engagement structures 8050 and 8052, the inspection detector 8042, the inspection camera 8044 (as shown in FIG. 21), a rear clamp 8052, a rear clamp control valve 8058, a center section electronics module 8040, toe wheels, a center section frame, adjustable ramps, the rear rotary union 8072, the rear rotation motor, a rear position sensor, the rotation module 8012, the purge seals 8046 and 8048 and the rear slip ring 8038.

In one embodiment, the purge seals 8046 and 8048 are configured to inflate at the same time as the clamps 8050 and 8052 are actuated. When both the purge seals 8046 and 8048 are inflated, they are constructed and arranged to engage the inner surfaces of the pipes 1022a, 1022b, respectively forming the chamber 8054 therebetween. In one embodiment, the purge seals 8046 and 8048, when inflated, engage on opposite sides of the interface region. In one embodiment, the chamber 8054 is a closed volume that may be referred to as a purge gas chamber 8054. In one embodiment, the chamber 8054 is constructed and arranged to receive a purge gas (or an insert gas) therein.

In one embodiment, the front clamp control valve 8056 and the rear clamp control valve 8058 are continuous 4-way directional valves (e.g., having four hydraulic connections, corresponding to inlet port (P), actuator ports (A and B), and return port (T), and one physical signal port connection (S)). For example, in one embodiment, one of the actuator ports A or B are used for extending their corresponding clamps 8050 or 8052 and inflating their corresponding seal 8046 or 8048 and the other of the actuator ports A or B are used for retracting their corresponding clamps 8050 or 8052 and deflating their corresponding seal 8046 or 8048.

Figure 22:
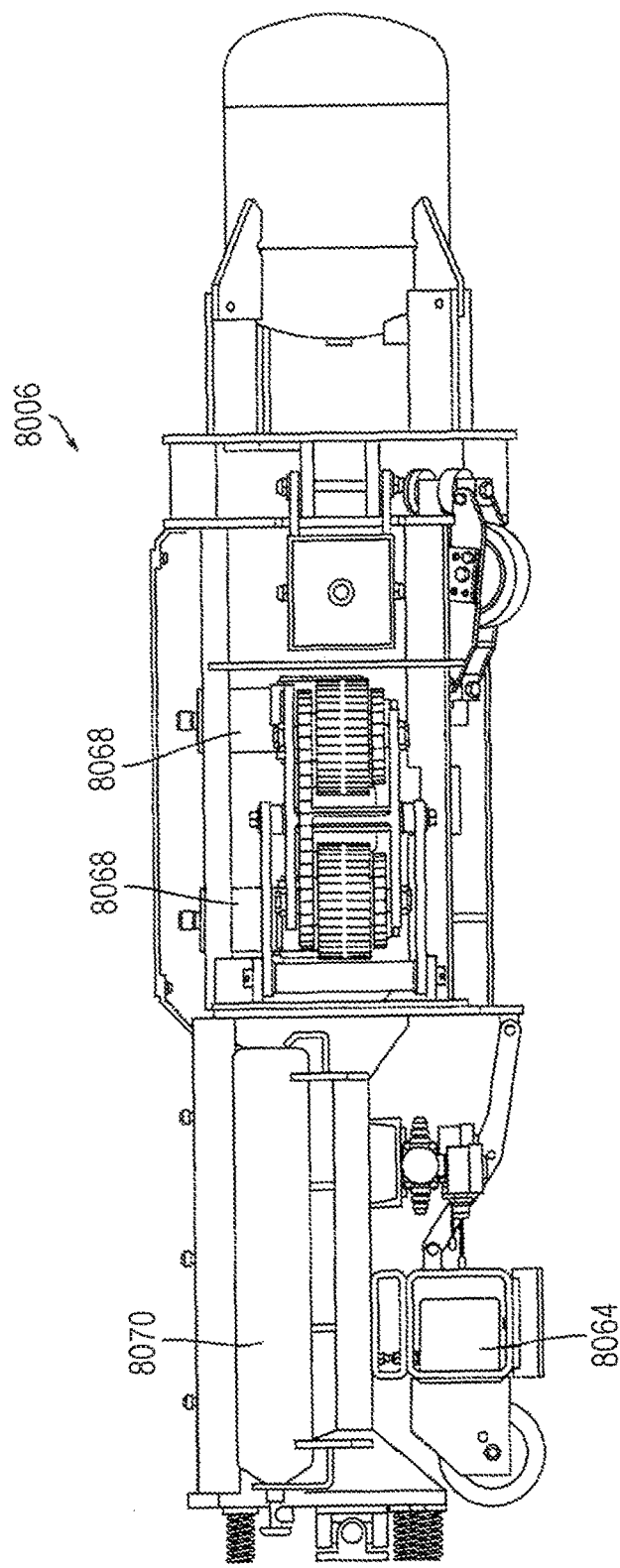
FIG. 22 shows a detailed view of a drive section of the purge and inspection system in accordance with an embodiment of the present patent application.

FIG. 22 shows a detailed side view of the drive section 8006 of the purge and inspection system 8001. In one embodiment, the drive section 8006 of the purge and inspection system 8001 includes the shield gas tanks 8070, batteries, drive section electronics module 8064, pneumatic valves, drive wheels, drive motors 8068, brakes and the compressed air tank, and the structure and operation of each of these components are similar those in the drive section of the internal weld system 5004.

Figure 23:
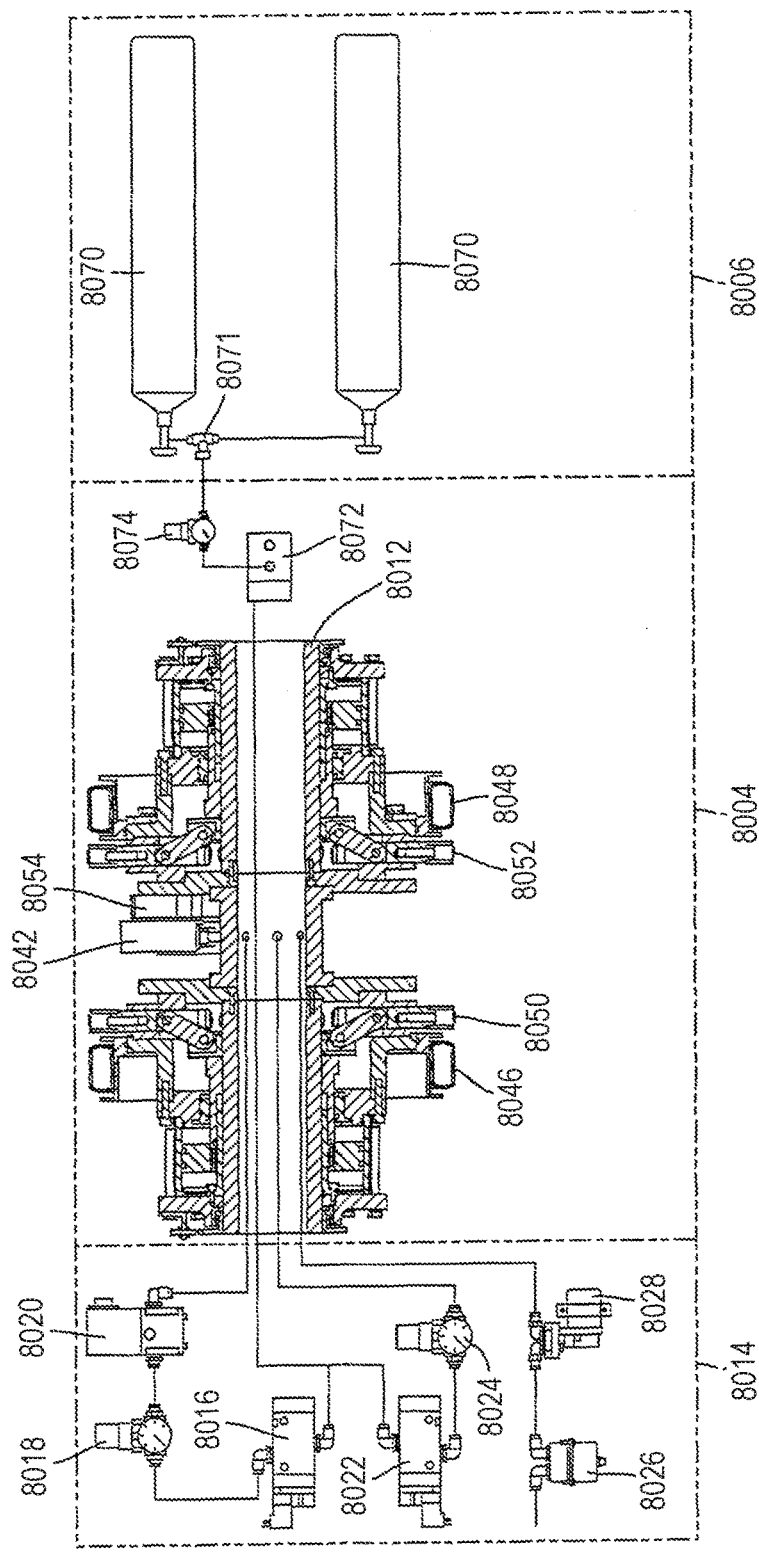
FIG. 23 shows a schematic diagram showing the flow of purge gas through the purge and inspection system in accordance with an embodiment of the present patent application.

FIG. 23 shows a schematic diagram showing the flow of purge gas through the purge and inspection system 8001, where some components of the purge and inspection system 8001 are not shown for sake of clarity and to better illustrate the other components and/or features of the purge and inspection system 8001.

In one embodiment, an inert/purge gas supply line is configured to communicate purge/insert inert gas source 8070 to the region 8054 between the first seal and the second seal 8046 and 8048. In one embodiment, the gas from the inert/purge gas source 8070 is directed into the region 8054 between the first seal and the second seal 8046 and 8048 to reduce oxidation during a welding operation.

Referring to FIG. 23, the purge gas tanks 8070 are shown in the drive section 8006 of the purge and inspection system 8001. In one embodiment, a high pressure regulator 8074 may be positioned in the drive section 8006 of the purge and inspection system 8001. In one embodiment, the high pressure regulator 8074 may be positioned in the center section 8004 of the purge and inspection system 8001. In one embodiment, the rear rotary union 8070, the rotatable hub 8012, the purge gas chamber 8054, the front and rear clamps 8050 and 8052, and the front and rear seals 8046 and 8048 are shown in the center section 8004 of the purge and inspection system 8001. The low purge valve 8016, the primary low purge regulator 8018, the secondary low purge regulator 8020, the high purge valve 8022, the high purge regulator 8024, the oxygen sensor 8026, and the pump 8028 are shown in the forward-most section 8002 of the purge and inspection system 8001.

In one embodiment, the purge gas tanks 8070 are configured to be maintained at a pressure of 500-2400 psi. The purge gas tanks 8070 are in fluid communication through fluid communication lines with the rear rotary union 8072. In one embodiment, the purge gas tanks 8070 are in fluid communication with the rear rotary union 8072 via a valve 8071 and the high pressure regulator 8074. In one embodiment, the high pressure regulator 8074 is configured to automatically cut off the flow of the purge gas at a pressure of 75 psi. That is, the high pressure regulator 8074 is typically set to reduce the pressure in the purge gas tanks 8070 to about 75 psi in the fluid communication line downstream of the high pressure regulator 8074, and from the rear rotary union 8072 to the low purge valve 8016 and the high purge valve 8022.

In one embodiment, the rear rotary union 8072 is in fluid communication through fluid communication lines with the low purge valve 8016 and the high purge valve 8022. In one embodiment, the purge gas stored in the purge gas tanks 8070 is sent through the fluid communication lines to the rear rotary union 8072, and then through the fluid communication lines from the rear rotary union 8072 to the low purge valve 8016 and the high purge valve 8022.

In one embodiment, the high purge regulator 8024 is connected to an outlet of the high purge valve 8022. That is, the high purge regulator 8024 is positioned downstream of the high purge valve 8022. In one embodiment, the high purge regulator 8024 is set to reduce the pressure output by the high purge valve 8022 to typically between 30 and 5 psi in the fluid communication line downstream of the high purge regulator 8024, and between the high purge regulator 8024 and the purge gas chamber 8054.

In one embodiment, a fluid communication line extends from the low purge valve 8016 to the primary low purge regulator 8018. In one embodiment, the primary low purge regulator 8018 is connected to an outlet of the low purge valve 8016. That is, the primary low purge regulator 8018 is positioned downstream of the low purge valve 8016.

In one embodiment, the primary low purge regulator 8018 is typically set to reduce the pressure output by the low purge valve 8016 to about between 0.5 and 5 psi in the fluid communication line downstream of the primary low purge regulator 8018, and between the primary low purge regulator 8018 and the secondary low purge regulator 8020.

In one embodiment, a fluid communication line extends from the primary low purge regulator 8018 to the secondary low purge regulator 8020. In one embodiment, the secondary low purge regulator 8020 is positioned downstream of the primary low purge regulator 8018.

In one embodiment, the secondary low purge regulator 8020 is set to reduce the pressure output by the primary low purge regulator 8018 to typically between 0.1 and 0.5 psi in the fluid communication line downstream of the secondary low purge regulator 8020, and between the secondary low purge regulator 8020 and the purge gas chamber 8054.

In one embodiment, the welding procedure is started at a pressure of about 0.5 psi and, during the welding procedure, when the leakage of the purge gas through the weld joint slows as a result of welding (e.g., based on how much gap between the pipe ends is welded), the secondary low purge regulator 8020 may then be throttled back to 0.1 psi.

In one embodiment, the pump 8028 is in fluid communication (through fluid communication lines) with the output/exit port of the purge gas chamber 8054 on one side and is in fluid communication (through fluid communication lines) with the oxygen sensor 8026 on the other side. In one embodiment, the pump 8028 is in fluid communication with the output of the purge gas chamber 8054 such that the pump 8028 is configured to operate (either continuously or intermittently) to draw a sample of the gas from the purge gas chamber 8054.

In one embodiment, the purge gas from the purge gas tanks 8070 is only used to fill and maintain the purge gas in the purge gas chamber 8054. In one embodiment, the compressed air is used to inflate the seals 8046 and 8048 and to expand the clamps 8050 and 8052. In one embodiment, the drive section 8006 of the purge and inspection system 8001 may include both the purge gas tanks 8070 and also the compressed air gas tanks.

FIG. 24 shows a schematic diagram showing the flow of compressed air through the purge and inspection system 8001, where some components of the purge and inspection system 8001 are not shown for sake of clarity and to better illustrate the other components and/or features of the purge and inspection system 8001.

The flow of compressed air through the purge and inspection system 8001 in FIG. 24 is similar to the flow of compressed air through the internal weld system 5004 in FIG. 70 (Patent Application No. PCT/US2015/22665), except for the differences noted below.

In one embodiment, a valve 8076 is positioned on a fluid communication line 8078. In one embodiment, the fluid communication line 8078 is between the rear clamp control valve 8058, the rear clamps 8052 and the rear seal 8046 and is configured to supply compressed air to expand the rear seal 8046 of the rear clamps 8052. In one embodiment, one output of the valve 8076 is configured to supply compressed air to expand the rear clamps 8052 and the other output of the valve 8076 is configured to supply compressed air to inflate the rear seal 8046.

In one embodiment, a valve 8082 is positioned on a fluid communication line 8084. In one embodiment, the fluid communication line 8084 is between the front clamp control valve 8056 and the front clamp 8050 and the front seal 8046 and is configured to supply compressed air to expand the front clamps 8050 and the front seal 8046. In one embodiment, one output of the valve 8082 is configured to supply compressed air to expand the front clamps 8050 and the other output of the valve 8082 is configured to supply compressed air to inflate the front seal 8046.

FIG. 26 shows a schematic diagram showing the flow of purge gas through the purge and inspection system 8001, where some components of the purge and inspection system 8001 are not shown for sake of clarity and to better illustrate the other components and/or features of the purge and inspection system 8001. For example, in one embodiment, in smaller purge and inspection systems 8001, the purge gas is used to not only to fill and maintain the purge gas in the purge gas chamber 8054 but also to inflate the seals 8046 and 8048 and to expand the clamps 8050 and 8052.

The flow of purge gas through the purge and inspection system 8001 in FIG. 26 is similar to the flow of purge gas through the purge and inspection system 8001 in FIG. 23, except for the differences noted below.

In one embodiment, the rear rotary union 8072 is in fluid communication through fluid communication lines with the low purge valve 8016, the high purge valve 8022 and the front rotary union 8104. In one embodiment, the purge gas stored in the purge gas tanks 8070 is sent through the fluid communication lines to the rear rotary union 8072, and then through the fluid communication lines from the rear rotary union 8072 to the low purge valve 8016 and the high purge valve 8022. In one embodiment, the purge gas is also sent through the fluid communication lines from the rear rotary union 8072 to the front rotary union 8104.

In one embodiment, the purge gas is sent through the fluid communication lines from the rear rotary union 8072 to the rear clamp control valve 8058. In one embodiment, the purge gas from the rear clamp control valve 8058 is supplied via fluid communication line 8088 to expand the rear clamps 8052 and is supplied via fluid communication line 8090 to inflate the rear seal 8048. In one embodiment, a pressure regulator 8092 is positioned on the fluid communication line 8090 and is configured to automatically cut off the flow of the purge gas to the seal 8048 at a predetermined pressure. In one embodiment, the purge gas from the rear clamps 8052 is received by the rear clamp control valve 8058 via fluid communication line 8094 to retract the rear clamps 8052.

In one embodiment, the purge gas is sent through the fluid communication lines from the front rotary union 8104 to the front clamp control valve 8056. In one embodiment, the purge gas from the front clamp control valve 8056 is supplied via fluid communication line 8098 to expand the front clamps 8050 and is supplied via fluid communication line 8100 to inflate the front seal 8046. In one embodiment, a pressure regulator 8102 is positioned on the fluid communication line 8100 and is configured to automatically cut off the flow of the purge gas to the seal 8046 at a predetermined pressure. In one embodiment, the purge gas from the front clamps 8050 is received by the front clamp control valve 8056 via fluid communication line 8096 to retract the front clamps 8050.

FIG. 26 shows a partial view of the purge and inspection system 8001 in which the inspection detector 8042 and the camera 8044 are configured to perform the inspection from inside the pipes while an external weld torch 8502 of the external weld system 8500 is configured to perform the welding external to the pipes 1022a, 1022b. In one embodiment, the externally positioned weld torch 8502 may be mounted to an outer surface of one of the first pipe and the second pipe 1022a, 1022b.

Figure 27:
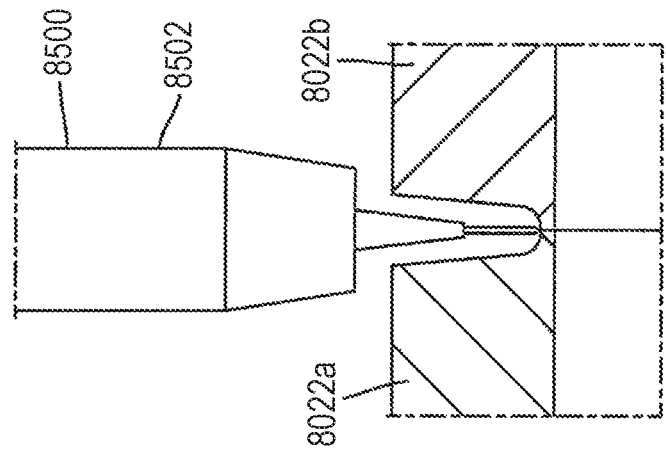
FIG. 27 shows a close-up view of an external weld torch of an external weld system used in the purge and inspection system in accordance with an embodiment of the present patent application.

For example, in FIG. 26, an ideal alignment of the weld torch 8502 to a bevel 8106 (along the longitudinal axis A-A of the pipes 1022a, 1022b) is shown. FIG. 27 shows a close-up view of the weld torch 8502 being aligned perfectly with the bevel 8106. The pipes 1022a, 1022b shown in FIGS. 26 and 27 are perfectly aligned and do not have any Hi-Lo.

Figure 29:
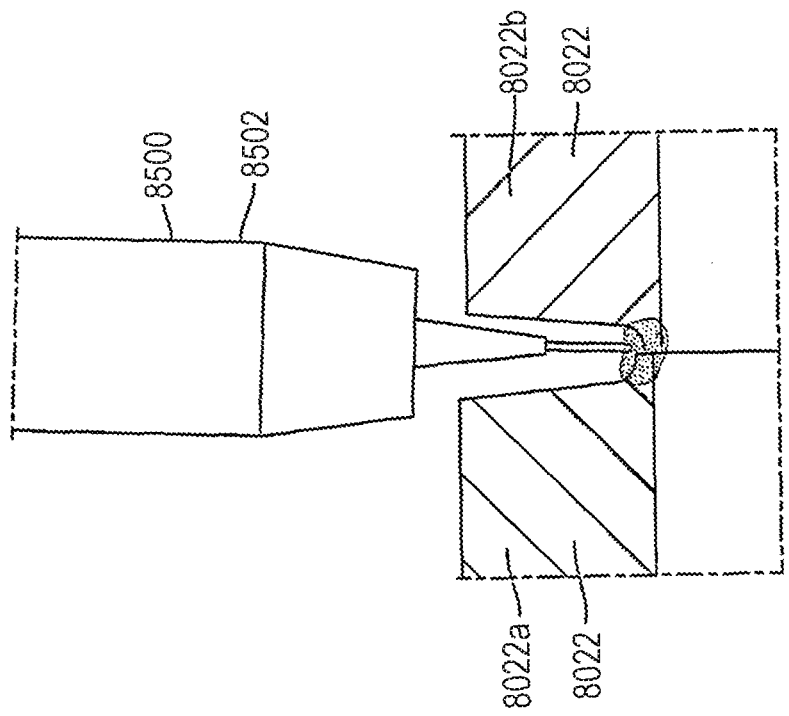
FIGS. 28 and 29 show close-up views of the external weld torch of the external weld system used in a prior art system and the purge and inspection system, respectively, where the pipes have a gap and radial offset (Hi-Lo) alignment; and Throughout this specification and figures like reference numbers identify like elements.
Figure 28:
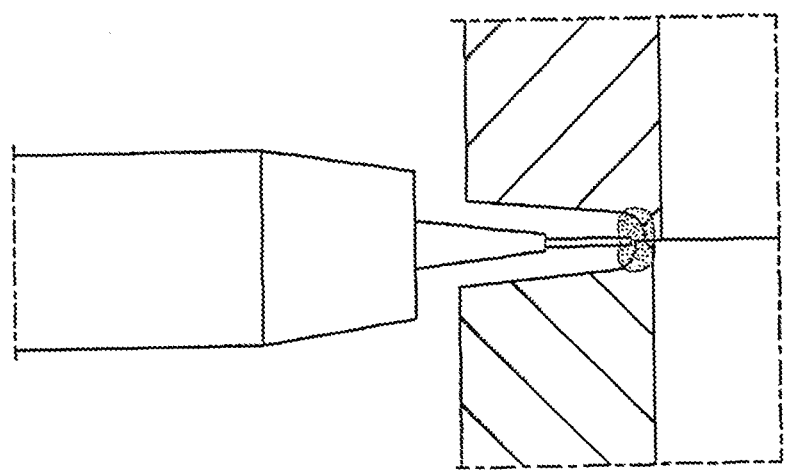

FIGS. 28 and 29 show close-up views of the external weld torch of the external weld system used in a prior art system and the purge and inspection system 8001, respectively, where the pipes have a gap and radial offset (Hi-Lo) alignment. For example, as shown in FIGS. 28 and 29, the pipes 1022a, 1022b have a 1 millimeter gap and radial offset (Hi-Lo).

As shown in FIG. 28, in the prior art system, the raised edge of the pipe shields the right side of the weld groove causing reduced weld penetration. As shown in FIG. 100, the external weld system 8500 used with the purge and inspection system 8001 is configured to receive weld profile data (e.g., prior to, during and subsequent to the welding procedure) from the purge and inspection system 8001 and is configured, based on the received weld profile data, to shift its external weld torch 8502 and/or to tilt its external weld torch 8502 to achieve a full weld penetration. Thus, the weld profile data from the purge and inspection system 8001 may be used by the external weld system 8500 to make better weld.

The operation of the purge and inspection system 8001 is now described. In one embodiment, the purge and inspection system 8001 is configured to be operated through a repeating cycle of operation.

After it has been determined that a weld has been completed in the current weld joint, one or more processors 8062 (of a computer system 8060) are configured to send communication signals to the purge electronics module 8032 to control (via control signals) the low purge valve 8016, the high purge valve 8022 and the secondary low purge regulator 8020 to deflate the purge seals 8046 and 8048. The one or more processors 8062 are also configured to send communication signals to the forward-most section electronics module 8036 to control/turn off (via control signals) the front clamp control valve 8056 to retract the first engagement structure 8050 to its original, retracted position and/or to deflate the purge seal 8046. The one or more processors 8062 are also configured to send communication signals to the center section electronics module 8040 to control/turn off (via control signals) the rear clamp control valve 8058 to retract the second engagement structure 8052 to its original, retracted position and/or to deflate the purge seals 8048. The purge and inspection system 8001 (including the purge seals 8046 and 8048 and the clamps 8050 and 8052) has to be moved to the next weld joint.

In one embodiment, the one or more processors 8062 are configured to send communication signals to the drive section electronics module 8064 to control (via control signals) the drive motors 8068 to accelerate the purge and inspection system 8001 to travel a predetermined speed and then decelerate and stop at the next weld joint. In one embodiment, the predetermined speed at which the purge and inspection system 8001 accelerates may be 6 feet/second.

When the second engagement structure 8052 is positioned at the next weld joint, the drive section electronics module 8064 sends communication signals to the purge electronics module 8032 to check alignment with the end of the pipe. In one embodiment, the purge electronics module 8032 is configured to operate (turn on) the one or more inspection detectors 8042 to measure where the second engagement structure 8052 are in relation to the end of the pipe. In one embodiment, the rotatable hub 8012 may not be operated when the one or more inspection detectors 8042 are measuring where the second engagement structure 8052 are in relation to the end of the pipe.

In one embodiment, the purge electronics module 8032 is configured send the measured distance data to the drive section electronics module 8064. In one embodiment, the drive section electronics module 8064 is configured to control (via control signals) the drive motors 8068 to move the second engagement structure 8052 by the measured distance data.

In one embodiment, when the second engagement structure 8052 is properly aligned and positioned in relation to the end of the pipe, the drive section electronics module 8064 is configured to send communication signals to the center section electronics module 8040 that the purge and inspection system 8001 is in position at the next weld joint. In one embodiment, the center section electronics module 8040 controls (opens via control signals) the rear clamp control valve 8058 to raise the second engagement structure 8052 and grip the old/existing pipe. In one embodiment, the center section electronics module 8040 controls (opens via control signals) the rear clamp control valve 8058 to inflate the rear seal 8048 at the same time.

The next/new pipe segment 1022*a* is then brought in, and slid over the forward-most section 8002 of the purge and inspection system 8001 into position by the working crew. At this time, the one or more processors 8062 are configured to send communication signals to the purge electronics module 8032 to operate the one or more inspection detectors 8042 to check the alignment of the pipes. In one embodiment, the one or more processors 8062 may rotate the rotatable hub 8012 to take measurements at multiple locations.

If the pipe alignment data is within a predetermined tolerance, the purge electronics module 8032 sends communication signals to the forward-most electronics module 8036 to actuate and operate the front clamp 8050. In one embodiment, the forward-most electronics module 8036 controls/opens (via control signals) the front clamp control valve 8056 to raise the first engagement structure 8052 and grip the new pipe segment 1022*a*. In one embodiment, the forward-most electronics module 8036 controls/opens (via control signals) the front clamp control valve 8056 to inflate the front seal 8046 at the same time.

If the pipe alignment data is not within the predetermined tolerance, the purge electronics module 8032 sends communication signals (a message) to the one or more processors 8062 identifying the misalignment between the pipes 1022*a*, 1022*b*. In one embodiment, this information may be relayed to a crane operator by traditional crane operator hand signals or by an electronic signal to a computer display terminal in the crane cab.

After the pipe is clamped, the one or more processors 8062 are configured to send communication signals to the purge electronics module 8032 to operate the one or more inspection detectors 8042 to measure the gap and radial offset (Hi-Lo) at a plurality of points along the circumference of the weld joint. In one embodiment, this data is communicated out to the one or more processors 8062 and compared against the allowable tolerances.

If the joint fit up (i.e., the gap and radial offset (Hi-Lo)) is within a predetermined tolerance, either the one or more processors 8062 or the purge electronics module 8032 sends communication signals to the operator indicating that welding may begin.

If the joint fit up (i.e., the gap and radial offset (Hi-Lo)) is not within the predetermined tolerance, a warning is sent to the operator, who can restart the clamping sequence or override the warning.

In one embodiment, the purge electronics module 8032 is configured to send control signals to the high purge valve 8022 to open and the high purge regulator 8024 to operate. In one embodiment, the purge electronics module 8032 is configured to continuously monitor the reading of the oxygen content level in the purge gas chamber 8054 from the oxygen sensor 8026. When the oxygen sensor's 8026 measurement data is below the predetermined oxygen content value (e.g., 500 parts per million (ppm)), the purge electronics module 8032 is configured to send control signals to the high purge valve 8022 to close and the low purge valve 8016 to open. In one embodiment, the oxygen sensor's 8026 measurement data is to be within a predetermined range (e.g., 50 to 100 ppm).

In one embodiment, while the high purge valve 8022 is open, the purge electronics module 8032 together with the forward-most section electronics module 8036 and the center section electronics module 8040 are configured to use the one or more inspection detectors 8042 to measure the gap and Hi-Lo of the weld joint at a plurality of points along the circumference of the weld joint. The results of the scan are communicated to the one or more processors 8062 to pre-program the external weld system 8500.

In one embodiment, after the low purge valve 8016 is closed, the secondary low purge regulator 8020 is configured to maintain a constant, set pressure in the purge gas chamber 8054. In one embodiment, the secondary low purge regulator 8020 is configured to maintain the pressure between 0.1 and 0.5 psi and is configured to stop its operation when the pressure is above 0.5 psi.

In one embodiment, the pressure starts out at a relatively high value (e.g., 5 psi) and is progressively gets to lower values as the weld proceeds. In one embodiment, the secondary low purge regulator 8020 may include a pressure sensor that is configured to communicate with the one or more processors 8062. In one embodiment, the pressure sensor is configured to measure pressure of the purge gas in the purge chamber 8054 and send a pressure data, which is indicative of the pressure of the purge gas in the purge chamber 8054, to the one or more processors 8062. In one embodiment, the one or more processors 8062 are configured to receive the pressure data, compare the received pressure data to its predetermined pressure value, and generate an overpressure signal if the pressure data is greater than the predetermined pressure value of 0.5 psi. In one embodiment, based on the overpressure signal, the purge and inspection system 8100 may be configured to open an exhaust valve structure to release the pressure in the purge chamber 8054 until the measured pressure falls below the predetermined pressure value. In one embodiment, based on the overpressure signal, the purge and inspection system 8100 may be configured to send communication signals to the external weld system to stop the welding procedure.

In one embodiment, communication signals are sent out the umbilical that correct purge gas level has been reached and the weld procedure can begin. In one embodiment, the operator issues the commands to the external weld system 8500 to begin the welding procedure. In one embodiment, the commands are automatically sent from the one or more processors 8062 to the external weld system 8500 to begin the welding procedure.

In one embodiment, the purge electronics module 8032 together with the forward-most section electronics module 8036 and the center section electronics module 8040 are configured to use the one or more inspection detectors 8042 to measure the gap and Hi-Lo of the weld joint a short distance ahead of where the external weld system 8500 is currently welding. In one embodiment, the inspection data from the inspection detector 8042 may be communicated in real-time to the one or more processors 8062 which use the inspection data to send updated welding parameters to the external weld system 8500.

In one embodiment, the external weld system 8500 is configured to communicate its position to the one or more processors 8062 which relay the information to the purge electronics module 8032 so that the purge electronics module 8032 can maintain the proper purge gas chamber pressure and control the position of the inspection detector 8042 appropriately.

In one embodiment, the weld procedure may be performed in several different ways.

In one embodiment, the weld procedure may be performed top to bottom on one side of the pipes and then top to bottom on the other side of the pipes. In one embodiment, the first weld is completed before the second weld begins. In this situation, the inspection detector 8042 scans ahead of the weld in real-time.

In one embodiment, the weld procedure may be performed top to bottom on each side of the pipe with the second weld starting before the first weld finishes. In one embodiment, the inspection detector 8042 scans a distance ahead of one weld faster than the welder is traveling then rapidly change position to the other weld to scan ahead of it. In one embodiment, the inspection detector 8042 may alternate between the two weld locations until the first weld finishes.

In one embodiment, the weld procedure may be performed all the way the pipes around in one pass with the inspection detector 8042 scanning a short distance ahead of the weld.

In one embodiment, after the weld is complete, the rotatable hub 8012 continues to rotate while the purge electronics module 8032 uses the inspection detector 8042 and the camera 8044 to inspect the weld. In one embodiment, the weld inspection data is communicated to the one or more processors 8062.

In one embodiment, if one or more weld defects are detected in the weld inspection data, the weld defects can be repaired while the clamps 8050 and 8052 are still in position and the purge gas chamber 8054 is still filled with inert gas.

In one embodiment, once the inspection and any repairs are complete and verified by the operator, the operator sends a command to the forward-most section electronics module 8036 and the center section electronics module 8040 to turn off the front and rear clamp control valves 8056 and 8058, lower/retract the clamping shoes 8050 and 8052, and deflate the seals 8046 and 8048.

In one embodiment, the one or more processors 8062 of the purge and inspection system 8100 may operatively connected to the forward-most electronics module of the purge and inspection system 8100, the purge electronics module 8032, the center section electronics module of the purge and inspection system 8100, and the drive section electronics module 8064.

In one embodiment, the field system of the present patent application may include one or more of splitters/hubs/routers that are configured to transmit data, control signals and communication signals between processor 8062 and one or more electronics modules described in this application.

The scope of this disclosure is to be broadly construed. It is intended that this disclosure disclose equivalents, means, systems and methods to achieve the devices, activities and mechanical actions disclosed herein. For each mechanical element, or mechanism, or method, or process disclosed, it is intended that this disclosure also encompass in its disclosure and teaches equivalents, means, systems and methods for practicing the many aspects, mechanisms and devices disclosed herein. Additionally, this disclosure regards a near-weld purge rig and its many aspects, features and elements. Such a near-weld purge rig can be dynamic in its use and operation, this disclosure is intended to encompass the equivalents, means, systems and methods of the use of the tool and its many aspects consistent with the description and spirit of the operations and functions disclosed herein. The claims of this application are likewise to be broadly construed.

The description of the inventions herein in their many embodiments is merely exemplary in nature and, thus, variations that do not depart from the gist of the invention are intended to be within the scope of the invention. Such variations are not to be regarded as a departure from the spirit and scope of the invention.

The invention claimed is:

1. A purge rig, the purge rig for insertion into a pipeline having a pipe interior, the pipeline including a first pipe end abutting a second pipe end to define a pipe end interface, the purge rig comprising:
   a core for at least partially defining a purge space;
   a purge dam extending from the core;
   a purge gas distributor supported on the core and longitudinally offset from the purge dam for discharging gas into the purge space;
   a purge gas supply passage supported on the core, the purge gas supply passage supplying purge gas to the purge gas distributor;
wherein the near weld purge rig is positioned in the pipe interior such that the gas distributor is generally aligned longitudinally with the pipe end interface and at least a portion of the core, at least a portion of the purge dam, and at least a portion of the pipe interior define the purge space; and
wherein the purge gas distributor includes at least two discharge nozzles having overlapping spray patterns and that direct purge gas against a portion of the interior surface at the pipe end interface.

2. The purge rig according to claim 1, wherein the directed purge gas exits the gas distributor to form a defined discharge pattern at every circumferential portion of the vertical weld run.

3. The purge rig according to claim 2, wherein the defined discharge pattern is generally v-shaped.

4. The purge rig according to claim 2, wherein the defined discharge pattern is generally cone-shaped.

5. The purge rig according to claim 4, wherein the directed purge gas impacts a defined surface portion of the pipe interior in the pattern at the pipe end interface.

6. The purge rig according to claim 5, wherein the gas distributor is defined by at least two radially outwardly directed gas distribution nozzle for impacting the defined surface portion.

7. The purge rig according to claim 6, wherein the defined surface portion of each of the nozzles together combine to impact the entire pipe interior at the pipe end interface, and wherein an end of the defined surface portion of each nozzle overlaps an end of the defined surface portion of each of the adjacent defined surface portions.

8. The purge rig according to claim 6, wherein the defined surface portion is an entire vertical weld run and the directed purge gas cools the defined surface portion to control weld material temperatures near the defined surface portion.

9. The purge rig according to claim 5, wherein the flow rate of the directed purge gas is controlled to cool the defined surface portion.

10. The purge rig according to claim 6, wherein a spray gap is defined as the radial distance between a tip of the nozzle and the pipe interior and the spray gap is between 0.25 and 1.5 inches.

11. The purge rig according to claim 1, wherein said near-weld purge gas space has a purge gas space pressure which is greater than an ambient pressure, when the near-weld purge rig is placed into the pipeline at the interface.

12. The purge rig according to claim 11, wherein during a gas purge, purge gas flows from the gas supply passage, through the purge gas distributor, into the purge space and out of the pipe interior to the atmosphere.

13. The purge rig according to claim 1, wherein said near-weld purge gas space achieves an oxygen concentration of about 100 to 200 ppm or less.

14. The purge rig according to claim 1, wherein the controller is an electronic control system; and
   wherein during a gas purge, purge gas flows from the gas supply passage, through the purge gas distributor, into the purge space and out of the pipe interior to the atmosphere.

15. The purge rig according to claim 14, wherein the purge dam acts as a barrier disrupting the flow of at least a portion of the purge gas in the purge space from flowing longitudinally down the pipe in a direction from the purge gas distributor toward the purge dam.

16. A purge rig, the purge rig for insertion into a pipeline having a pipe interior, the pipeline including a first pipe end abutting a second pipe end to define a pipe end interface, the purge rig comprising:
   a core for at least partially defining a purge space;
   a purge dam extending from the core;
   a purge gas distributor supported on the core and longitudinally offset from the purge dam for discharging gas into the purge space;
   a purge gas supply passage supported on the core, the purge gas supply passage supplying purge gas to the purge gas distributor;
wherein the near weld purge rig is positioned in the pipe interior such that the gas distributor is generally aligned longitudinally with the pipe end interface and at least a portion of the core, at least a portion of the purge dam, and at least a portion of the pipe interior define the purge space; and
wherein the purge gas distributor includes at least two discharge nozzles having overlapping spray patterns and that direct purge gas against an entire length of a pipe interior surface at vertical weld runs where heated weld material is most susceptible to gravitational forces.

17. The purge rig of claim 16, wherein the purge dam extending from the core is a single purge dam extending from the core.

* * * * *